US007506068B2

(12) United States Patent  (10) Patent No.: US 7,506,068 B2
Liou et al.  (45) Date of Patent: *Mar. 17, 2009

(54) METHOD, APPARATUS AND SYSTEM FOR TRANSFORMING, CONVERTING AND PROCESSING MESSAGES BETWEEN MULTIPLE SYSTEMS

(75) Inventors: Ming-Tao Liou, Fremont, CA (US); Hwee Har Yeap, San Mateo, CA (US); Chiun-Feng Hsiao, Belmont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1064 days.

This patent is subject to a terminal disclaimer.

(21) Appl. No.: 10/211,442

(22) Filed: Aug. 2, 2002

(65) Prior Publication Data

US 2007/0239818 A1  Oct. 11, 2007

Related U.S. Application Data

(60) Provisional application No. 60/316,385, filed on Aug. 30, 2001, provisional application No. 60/341,943, filed on Dec. 18, 2001.

(51) Int. Cl.
*G06F 15/16* (2006.01)
*G06F 7/00* (2006.01)
(52) U.S. Cl. ............... 709/246; 709/201; 709/230; 709/246; 707/10
(58) Field of Classification Search .............. 455/550.1; 709/201, 230, 246
See application file for complete search history.

(56) References Cited

U.S. PATENT DOCUMENTS 5,649,195 A  7/1997  Scott et al. .................. 395/617
5,813,009 A  9/1998  Johnson et al. ............. 707/100
5,835,757 A  11/1998  Oulid-Aissa et al. ........ 395/610
5,956,721 A  9/1999  Douceur et al. ............. 707/10
5,995,980 A  11/1999  Olson et al. ................. 707/201
6,052,685 A  4/2000  Eastwick et al. ............ 707/10
6,167,405 A  12/2000  Rosensteel, Jr. et al. ..... 707/102
6,219,694 B1  4/2001  Lazaridis et al. ............ 709/206
6,240,417 B1  5/2001  Eastwick et al. ............ 707/10
6,359,630 B1  3/2002  Morse et al. ................. 345/620
6,487,558 B1  11/2002  Hitchcock ................... 707/200
6,615,223 B1  9/2003  Shih et al. .................... 707/201
6,711,592 B2  3/2004  Ono ............................ 707/204
6,795,868 B1  9/2004  Dingman et al. ............ 709/246
6,981,041 B2  12/2005  Araujo et al. ............... 709/224
7,099,891 B2*  8/2006  Harris et al. ............. 707/104.1
2001/0034733 A1  10/2001  Prompt et al. ............... 707/102
2002/0023113 A1  2/2002  Hsing et al. ................. 707/513
2002/0059299 A1  5/2002  Spacy ...................... 707/104.1
2002/0087573 A1  7/2002  Reuning et al. ............. 707/102
2002/0103854 A1  8/2002  Okita ......................... 703/203
2003/0023759 A1*  1/2003  Littleton et al. ............. 709/248
2004/0024795 A1*  2/2004  Hind et al. .................. 707/204
2007/0226366 A1  9/2007  Liou et al. .................. 709/238
2007/0239818 A1  10/2007  Liou et al. .................. 709/201

* cited by examiner

*Primary Examiner*—Ashok B Patel
(74) *Attorney, Agent, or Firm*—Campbell Stephenson LLP

(57) ABSTRACT

In one embodiment, the present invention is a method of sending change information from a first database to a second database. The method includes managing a set of transactions to produce a first message using custom scripts and default processing. The method also includes transforming the first message into a second message using custom scripts and default processing. The method further includes converting the second message into a transmittable message using custom scripts and default processing.

9 Claims, 22 Drawing Sheets

METHOD, APPARATUS AND SYSTEM FOR TRANSFORMING, CONVERTING AND PROCESSING MESSAGES BETWEEN MULTIPLE SYSTEMS

CLAIM OF DOMESTIC PRIORITY

This application claims priority to previously filed provisional applications having Ser. No. 60/316,385, entitled "METHOD, APPARATUS AND SYSTEM FOR DISPATCHING, TRANSFORMING, CONVERTING AND PROCESSING MESSAGES BETWEEN MULTIPLE SYSTEMS" and filed on Aug. 30, 2001 and having Ser. No. 60/341,943, entitled "METHOD, APPARATUS AND SYSTEM FOR DISPATCHING, TRANSFORMING, CONVERTING AND PROCESSING MESSAGES BETWEEN MULTIPLE SYSTEMS WITH OPTIONAL CUSTOMIZATION" and filed on Dec. 18, 2001.

BACKGROUND OF THE INVENTION

1. Field of the Invention

The invention relates to database technology generally and more specifically to synchronization and transfer of information between multiple databases of varying form.

2. Description of the Related Art

As will be understood, it has long been known that multiple databases may include different versions of the same information. Furthermore, databases may be structured such that it is expected that the database will have outdated information relative to another database, the second database may be expected to own the information and provide updates to the first database.

Transferring such information and updates may be problematic when the first and second database do not share the same schema or are managed by different systems. Therefore, it would be valuable to be able to provide a method or apparatus for transferring information between databases without depending on identical internal structures for example.

Furthermore, systems may be expected to receive a variety of types of information, bound for a variety of distinct destinations within the system. However, determining where the information is bound is not necessarily transparent, and providing a method or system to make such determinations may be useful.

BRIEF DESCRIPTION OF THE DRAWINGS

The present invention is illustrated by way of example and not limitation in the accompanying figures.

DETAILED DESCRIPTION

Figure 1:
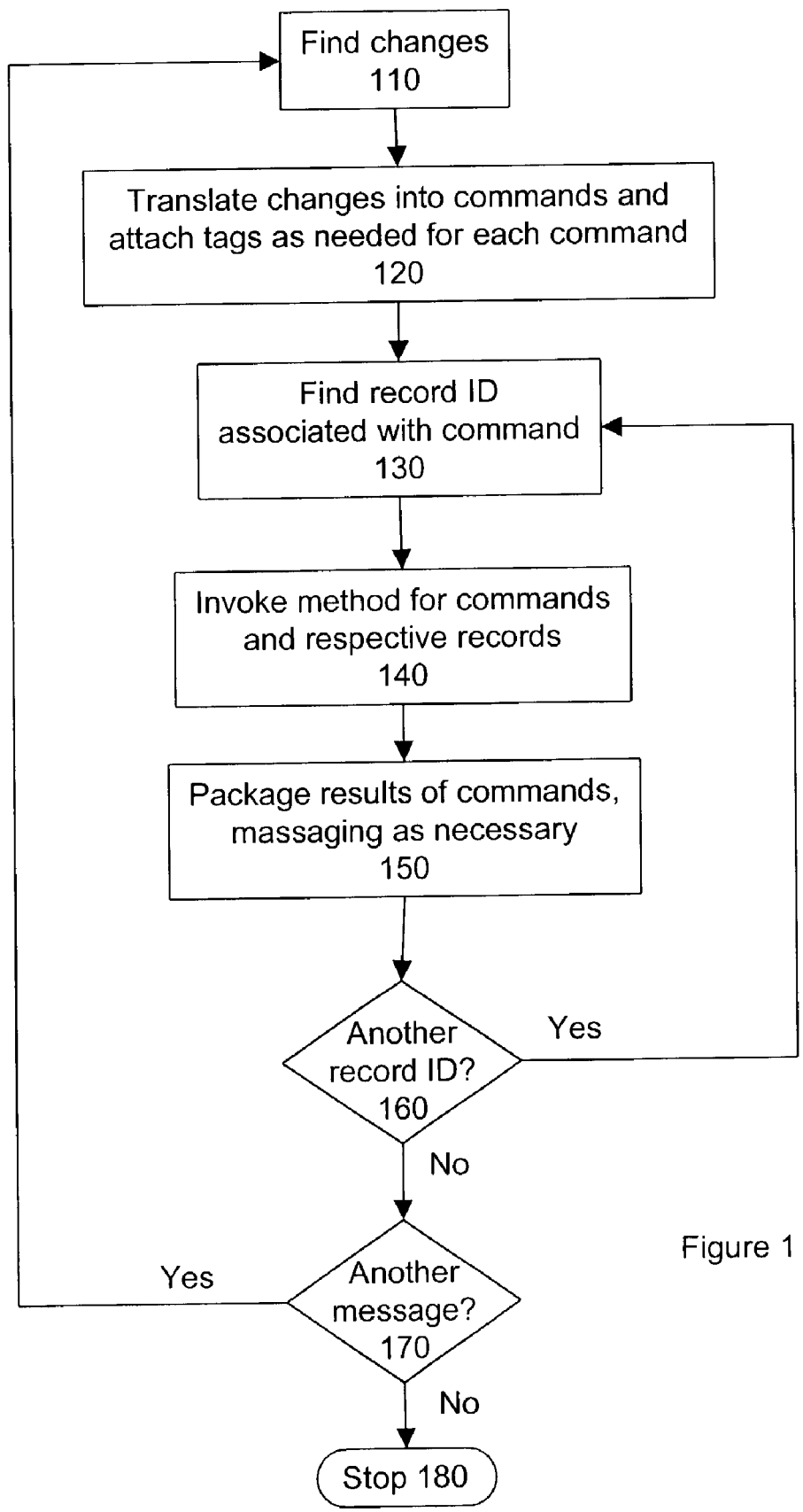
FIG. 1 illustrates an embodiment of transaction processing.

A method, apparatus and system for dispatching, transforming, converting and processing messages between multiple systems with optional customization is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. Where reference numbers are utilized, like reference numbers refer to similar or identical components.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the present invention is a method of sending change information from a first database to a second database. The method includes managing a set of transactions to produce a first message. The method also includes transforming the first message into a second message. The method further includes converting the second message into a transmittable message.

In an alternate embodiment, the present invention is a method of receiving change information for a second database from a first database. The method includes converting a received message into a second message. The method further includes transforming the second message into a third message. The method also includes processing the third message to form a set of transactions. The method may further include effecting changes in the second database with the set of transactions.

In another alternate embodiment, a process for sending messages incorporating changes or updates to a database is described. The process includes processing transactions in a database to create a message. The process further includes processing the message to conform to data transformation engine specifications. The process also includes processing the message to convert the message into a transmittable form. The process may also include transmitting the message.

In still another alternate embodiment, a process for receiving messages incorporating changes or updates to a database is described. The process includes processing the message to convert the message from a transmittable form to an internally usable form. The process further includes processing the message based on data transformation engine specifications. The process also includes processing transactions in a database from data included in the message. The process may also include receiving the message.

In yet another alternative embodiment, a process for dispatching received messages within a system is described. The process includes receiving a message, identifying a type of the message, and dispatching the message to a destination based on the type of the message. The process may include consultation of a set of rules to determine the type of the message and/or to determine a proper or desired destination for the message.

In yet another alternate embodiment, an optionally customizable process for sending messages incorporating changes or updates to a database is described. The process includes processing transactions in a database to create a message. The process further includes processing the message to conform to data transformation engine specifications. The process also includes processing the message to convert the message into a transmittable form. The process may also include transmitting the message. Each portion of the process may be either customized or achieved in a default manner.

In an alternate embodiment, an optionally customizable process for receiving messages incorporating changes or updates to a database is described. The process includes processing the message to convert the message from a transmittable form to an internally usable form. The process further includes processing the message based on data transformation engine specifications. The process also includes processing transactions in a database from data included in the message. The process may also include receiving the message. Again, each portion of the process may be either customized or may proceed without customization.

Note that reference is made to transformation and reformatting of messages. Typically this refers to massaging the message based on pre-defined rules which may be customized according to the use of the methods. The messages may include data which represents transactions or changes within a database, and may have that data wrapped in other data making the message suitable for transfer or transmission for example.

One embodiment of a method of assembling a message involves transforming a set of transactions from a database into an XML format message. As will be appreciated, tags may be embedded in the message which would not be appropriate for processing in a database system but which may facilitate identification of the message and/or its transaction contents. Moreover, the transactions may need values substituted in based on a new database, or placeholders for values specific to an old database, such as foreign key values which may vary from system to system or database to database. Thus, transforming the message may include both substitution between values and placeholders on each end and embedding or stripping of tags, headers, envelopes, and other artifacts associated with processing or transmission of a message.

In an alternate embodiment, customization overrides may allow for assembly into a generally non-supported or proprietary format for the resulting message. Such customization will replace, rather than supplement, default processing which results in the message in question. Furthermore, as will be appreciated, alternate embodiments may relate to processing or transforming a message into transactions which may be used to replicate changes to a first database in a second database.

FIG. 1 illustrates an embodiment of transaction processing. At block 110, changes, such as those in a database, are found for processing purposes. These changes may encompass all changes since a previous transaction processing event, or may be defined in some other way appropriate to capturing information deemed desirable by a system designer or manager. At block 120, all of the changes found are translated into commands and tags are attached as needed for each command. The tags attached may be useful in future processing of the message by providing formatting cues and either providing pointers to or encoding in the tag conversion rule sets for the commands.

At block 130, a record ID associated with each command is found—a record which was changed (or would change) as a result of the command in question. At block 140, the method for each command is invoked with respect to a set of objects relative to the record found at block 130. Thus, the commands corresponding to transactions are effectively executed on a record changed in the transactions. The objects in question are those within the database in which the transactions occurred. At block 150, the results of the commands are packaged into a message, with some massaging or transformation as may be available in the process of capturing the results.

At block 160, a determination is made as to whether another record ID exists which was affected by the transactions in question. If so, that record ID is found at block 130 as before. If not, a determination is made as to whether another message needs to be generated at block 170. If so, the process returns to block 110 to find changes in the database. If not, the process terminates at block 180.

Figure 2:
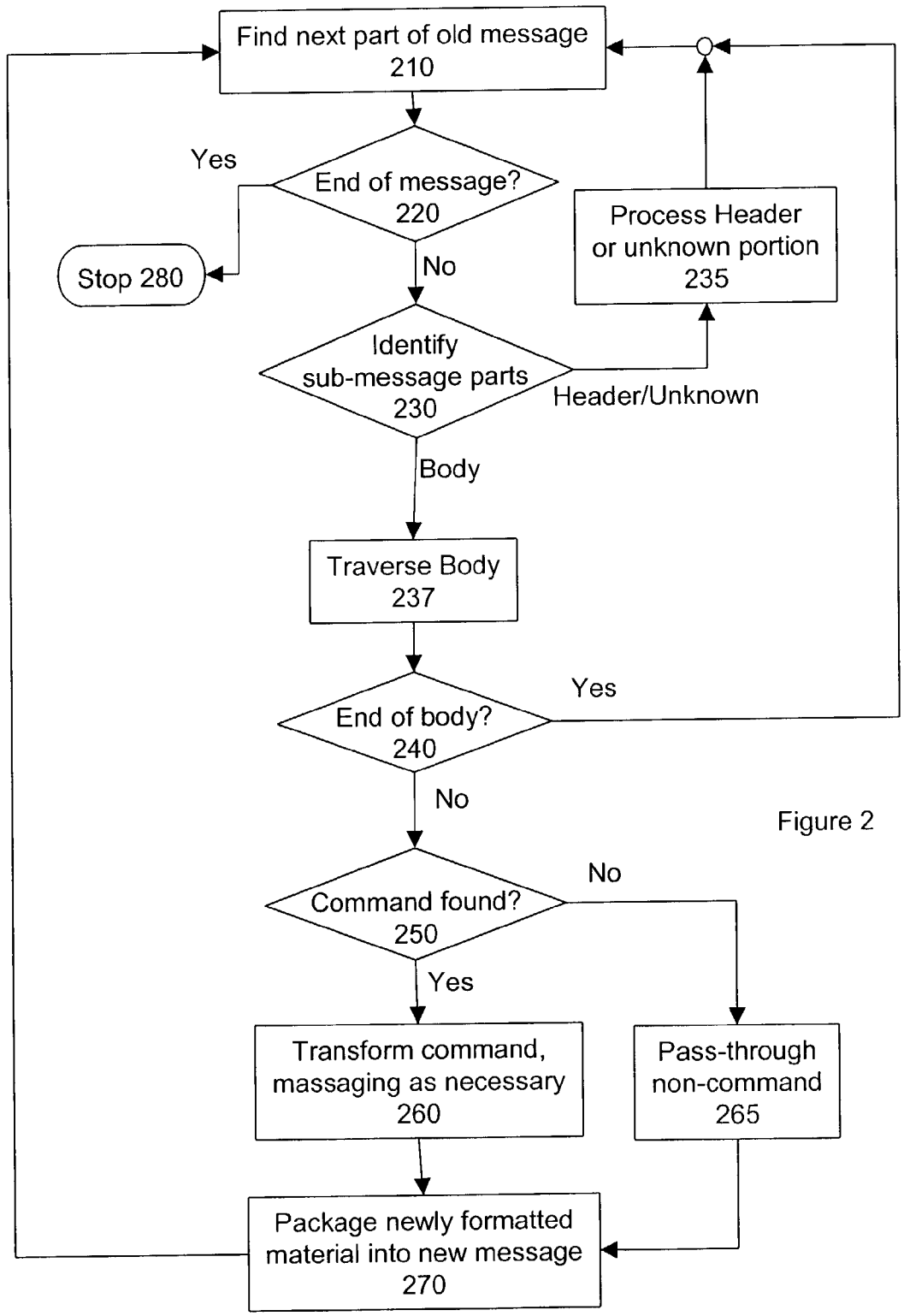
FIG. 2 illustrates an embodiment of data transformation engine processing.

FIG. 2 illustrates an embodiment of data transformation engine processing. At block 210, a next (or first) part of an old (untransformed) message is found. At block 220, a determination is made as to whether this is the end of the message. If so, at block 280, the process terminates with pass-through of the end of the message or a suitable end for the transformed message.

If not, at block 230, the sub-message part found at block 210 is identified as either being a body part, a header part, or an unknown part. If the sub-message part is either a header or unknown part, it is processed at block 235, typically by passing through the information from the untransformed to the transformed message, although other processing (even discard of the data) may be specified.

If the sub-message part is the body of the message, at block 237, the body is traversed until a first sub-part of the body is found. Typically, this sub-part will correspond either to a command or to an end of the body, although it may correspond to some unrecognized portion of the body, too. At block 240, a determination is made as to whether the end of the body has been reached. If so, the process returns to block 210 to find the next part of the message.

If not, a determination is made as to whether a command has been found at block 250. If so, the command is transformed based on pre-defined rules at block 260. If not, the non-command portion is passed through untouched at block 265. At block 270, the either transformed command or untransformed non-command portion are packaged into the transformed message, and the process then returns to continue traversing to the next sub-part of the body.

Figure 3:
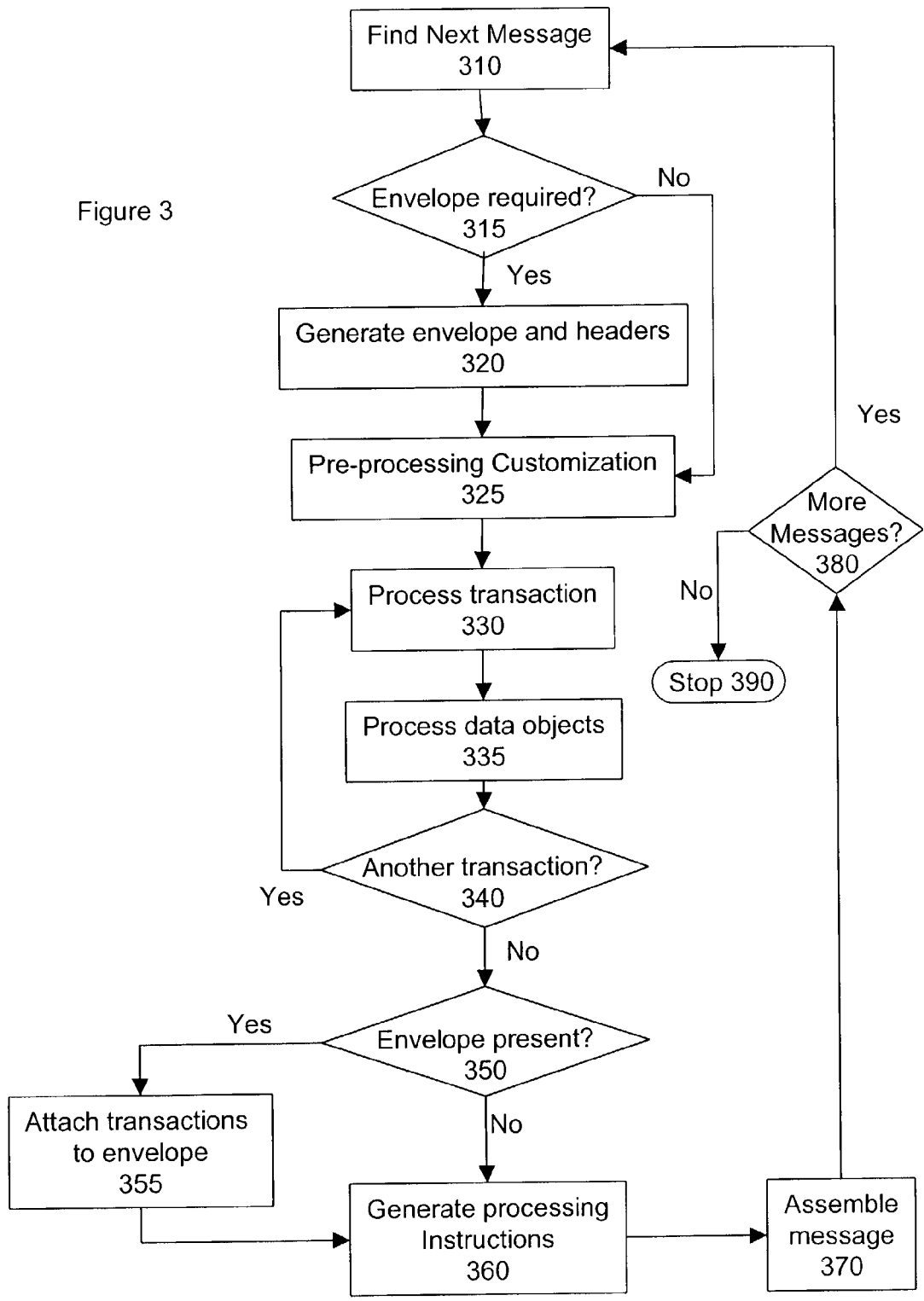
FIG. 3 illustrates an embodiment of converter processing.

FIG. 3 illustrates an embodiment of converter processing. At block 310, the next (or first) message to be converted is found. At block 315, a determination is made as to whether an envelope is required. This determination may be based on the format of the message found, or based on requirements of the destination for the message for example. At block 320, if an envelope is necessary, the envelope and any associated headers are generated for the message. If no envelope is necessary, or after the envelope is generated, custom pre-processing of the message may occur at block 325. This is an optional part of the process, allowing for customization by a system manager for example through specification of rules or formats for messages, and need not be implemented to achieve the desired result in all cases.

At block 330, a transaction within the message is processed according to pre-defined rules to make it ready for transmission. At block 335, the data objects associated with the transaction are similarly processed according to pre-defined rules. As will be appreciated, this processing may be specified in a variety of ways. However, it will be appreciated that the processing in question will typically involve processing material made available from a data transformation engine process for purposes of transmission through a transmission apparatus such as a message queue or other transport mechanism.

At block 340, a determination is made as to whether another transaction remains unprocessed. If so, the process returns to block 330. If not, a determination is made as to whether an envelope is present, such as an envelope generated at block 320. If so, the processed transactions are attached to the envelope at block 355. After attaching the processed transactions to the envelope, or if no envelope is present, the message (consisting of either an envelope with transactions attached or a set of transactions) is provided with processing instructions to be used by a recipient of the message at block 360. At block 370, the message is assembled, including transactions, attached envelope if present, and any appropriate processing instructions, and the message is made available for transmission or transfer.

At block 380, a determination is made as to whether more messages need to be processed. If not, the process terminates at block 390. If so, the process returns to block 310 to find the next message.

Figure 4:
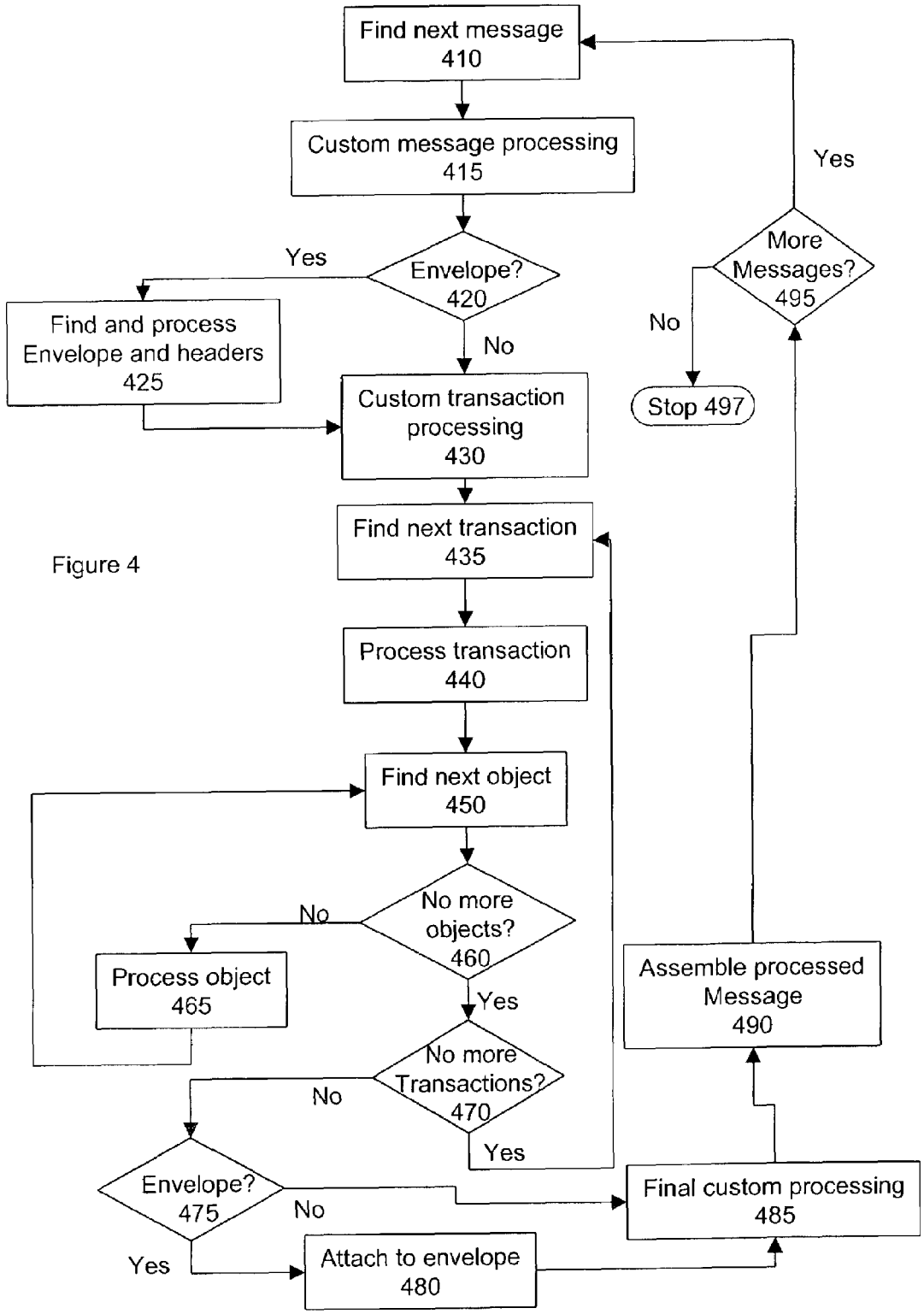
FIG. 4 illustrates an alternate embodiment of converter processing.

FIG. 4 illustrates an alternate embodiment of converter processing. At block 410, the next (or first) message received is found. At block 415, any custom message processing, such as that specified by a system manager for example, is performed. At block 420, presence of an envelope is detected. If the envelope is present, at block 425, the envelope and associated headers are processed. After processing the envelope, or if no envelope is present, at block 430, further custom transaction processing may be specified by a system manager for example and then performed. Note that typically the custom processing would be specified prior to processing, and pre-defined rules within the specifications would determines whether such custom processing occurs.

At block 435, a next (or first) transaction within the message is found. At block 440, the transaction is processed, transforming it from a format suitable for transmission or transfer into a format suitable, for example, for use in data transformation engine processing. At block 450, a next (or first) object associated with the transaction is found. If an object is determined to have been found at block 460, the process moves to block 465, and the object is processed, such as by transforming it from a format suitable for transmission or transfer into a format suitable, for example, for use in data transformation engine processing.

If no object was found, a determination is made at block 470 as to whether further transactions are to be found in the message. If yes, then the process returns to block 435 and the next transaction is found. If no, a determination is made as to whether an envelope is associated with the message at block 475. If so, the processed objects and transactions are attached to the envelope as processed at block 425. If not, or after attachment to the envelope, another opportunity for custom processing is allowed at block 485. Finally, the processed message is assembled at block 490 and is made available to the rest of the system.

At block 495, a determination is made as to whether more messages are available for processing. If not, the process terminates at block 497. If so, the process returns to block 410 and the next message to be processed is found.

Figure 5:
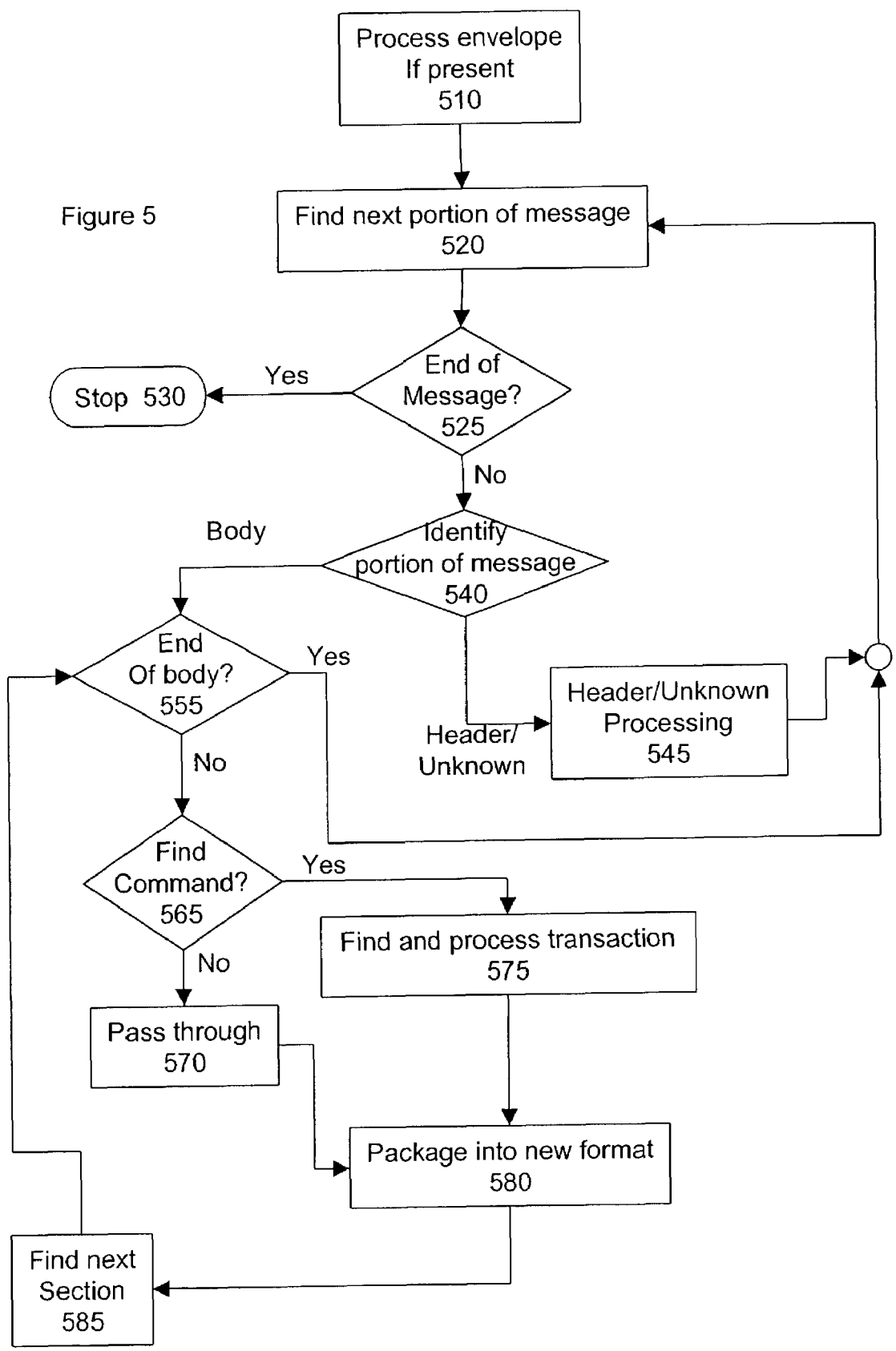
FIG. 5 illustrates an alternate embodiment of data transformation engine processing.

FIG. 5 illustrates an alternate embodiment of data transformation engine processing. At block 510, an envelope of a message is processed (transformed according to a pre-defined set of rules) if the envelope is present. At block 520, the next portion of the message (following any attached envelope for example) is found. At block 525, a determination is made as to whether the end of the message has been found. If so, at block 530, the process terminates, and the message has been transformed to the extent expected based on the data transformation engine process.

If the end of the message has not been found, at block 540, the portion of the message found is identified. If the portion is found to be either a header portion or an unknown portion, then that portion is processed at block 545. However, this processing at block 545, in one embodiment, may simply include passing through the header or unknown portion. The process then proceeds to block 520 and the next portion of the message is found.

If a body portion of the message is determined to be the portion found, then at block 555, a determination is made as to whether the end of the body has been found. If so, the process proceeds to block 520 and the next portion of the message is found. If not (the end of the body has not been found), then at block 565 a determination is made as to whether the sub-part of the body found is a command. If so, the transaction related to the command is found and processed at block 575. If not, the sub-part of the body is passed through at block 570. All parts of the body are then packaged into a new format based on pre-defined rules for repackaging at block 580. At block 585, the next section of the body (the next sub-part) is found, and then the process proceeds to block 555.

Figure 6:
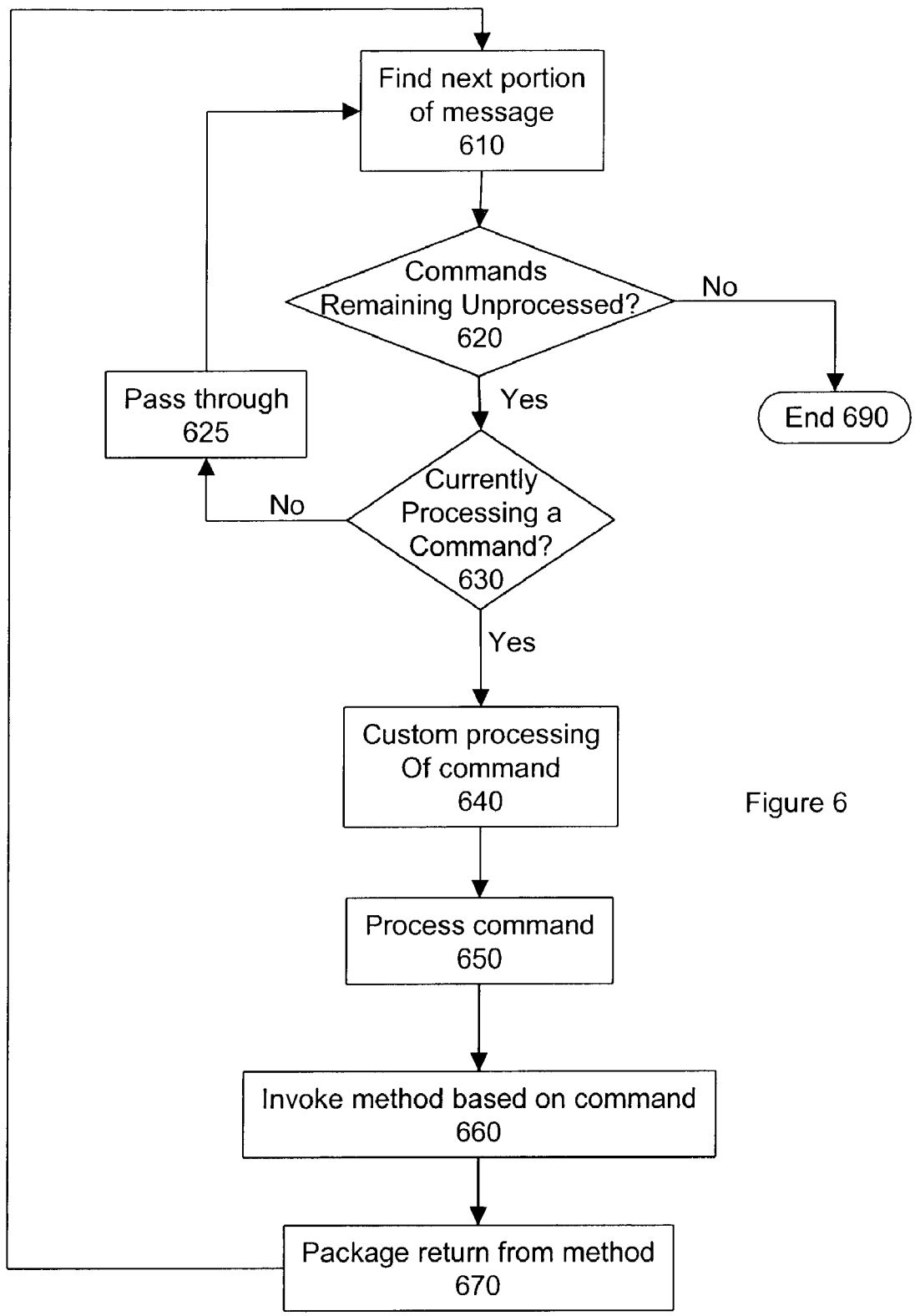
FIG. 6 illustrates an alternate embodiment of transaction processing.

FIG. 6 illustrates an alternate embodiment of transaction processing. At block 610, a next (or first) portion of a message is found. At block 620, a determination is made as to whether commands within the message remain unprocessed. If all commands have been processed, the next portion of the message is the end of the message, so the process terminates at block 690.

If commands remain to be processed, then at block 630, a determination is made as to whether the portion of the message found at block 610 is a command. If it is not, then the portion of the message is passed through at block 625, and the process returns to block 610 to find the next portion of the message.

If the portion of the message is a command, an opportunity for custom processing of commands based on a pre-defined set of rules is provided at block 640. Such custom processing may be specified by a system manager for example. At block 650, the command is processed against a receiving database, and at block 660, a method of an object corresponding to the command is invoked for records in the receiving database, thereby effecting the change to be caused by the command. At block 670, the return from the method (the result of the command) is packaged, and the process then flows to block 610 to find the next portion of the message. In capturing the returns from the method, the process may also invoke the execution method for the appropriate object, thereby generating a response message to the sending external system.

Figure 7:
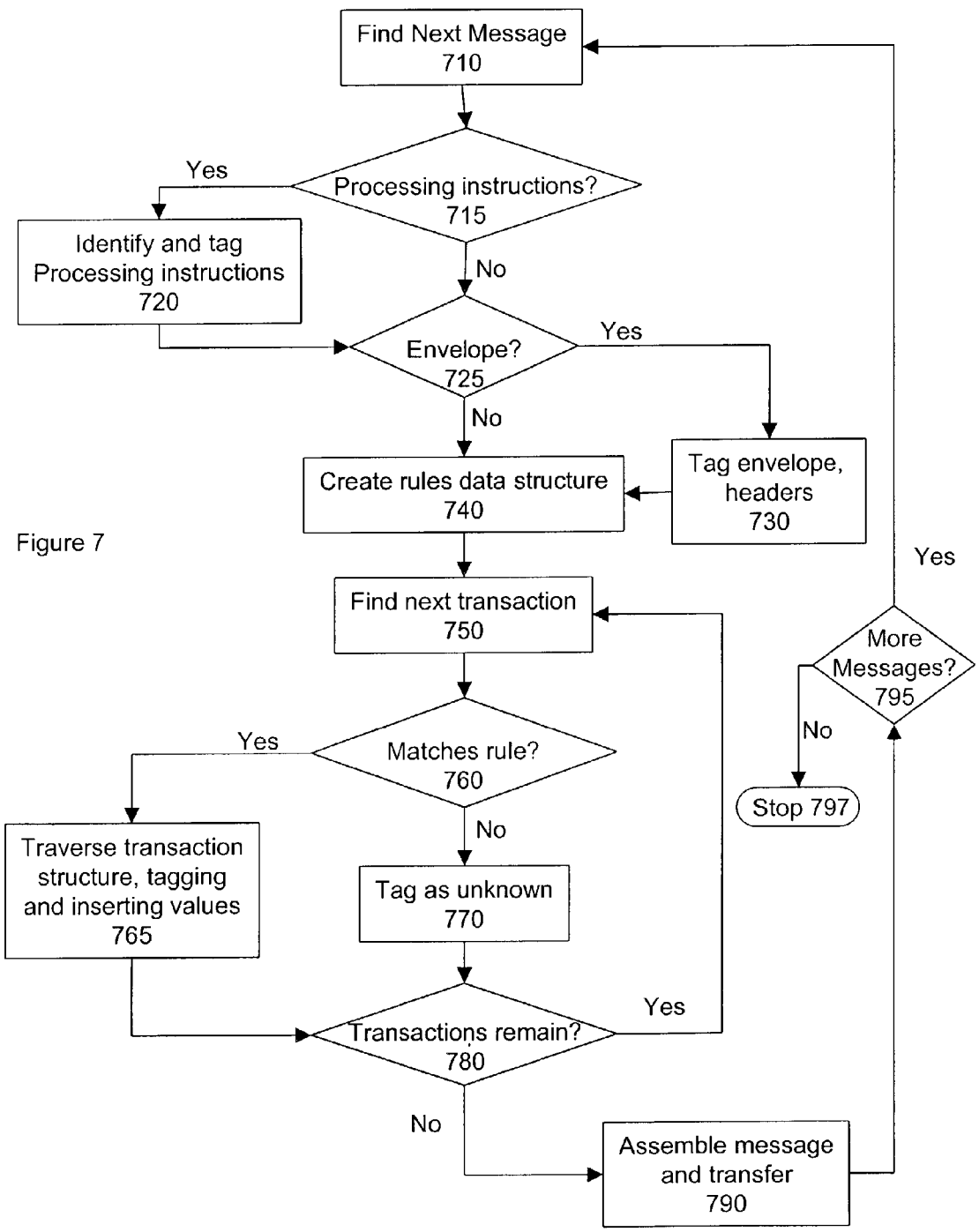
FIG. 7 illustrates an embodiment of message dispatch.

FIG. 7 illustrates an embodiment of message dispatch. The process illustrated can be described as follows. First, a message is received. Then, processing instructions within the message are identified and decoded. Next, an envelope is identified and decoded. In the process, headers for messages within the envelope are also decoded.

The pre-defined rules for processing the message are parsed into tokens and placed into a hash tree or other suitable data structure. Separately, the transactions in the command hierarchy of the message are processed and accessed against the rule sets stored in the hash tree. The processed message is then sent to the appropriate part of the system for use therein.

At block 710, the next message received is found. At block 715, processing instructions within the message are detected, and at block 720, such processing instructions, if present, are tagged and identified for use by the receiver of the message. At block 725, a determination is made as to whether an envelope is present in the message. If so, at block 730, the envelope and any associated headers are tagged, allowing for ease of identification of these portions of the message in later processing. At block 740, a rules data structure for processing the message is created, such as a hash tree of objects against which the contents of the message may be matched. The rules data structure may be based on a pre-defined set of rules which determine how messages, or expected messages, are to be processed.

At block 750, the next (or first) transaction (or portion) of the message is found. At block 760, a determination is made as to whether the transaction matches a rule of the rules data structure, thus indicating that a known method for processing the transaction exists within the system in question. At block 765, a known transaction has its structure of objects traversed, with tags or values inserted or substituted into the structure to facilitate processing based on the matched rule. At block 770, a transaction or portion which does not match any known rules is tagged as an unknown portion.

At block 780, a determination is made as to whether transactions remain to be processed. If so, the process then proceeds to block 750. If not, the process proceeds to block 790 where the message is assembled and transferred to its destination within the system. At block 795, a determination is made as to whether more messages are present for processing. If so, the process returns to block 710 to find the next message. If not, the process terminates at block 797.

Note that with respect to FIGS. 1-7, custom processing has been discussed for various blocks. Such custom processing would depend on software or repository (database) configuration. As an illustrative example, a user-defined field may have a particular format which is not supported by normal processing and would thus tend to cause unpredictable or erroneous behavior in the normal processing of the messages. However, by configuring the software or database to properly handle the field, the processing for that field may be customized, such that a date field with an unusual format may be properly handled without losing information for example. Such configuration may be achieved without requiring the software to resort to external sources of information or code (scripts or libraries for example) beyond what would normally be accessed simply to process the data, namely the original code and configuration information of the software and the information in the database.

Figure 8:
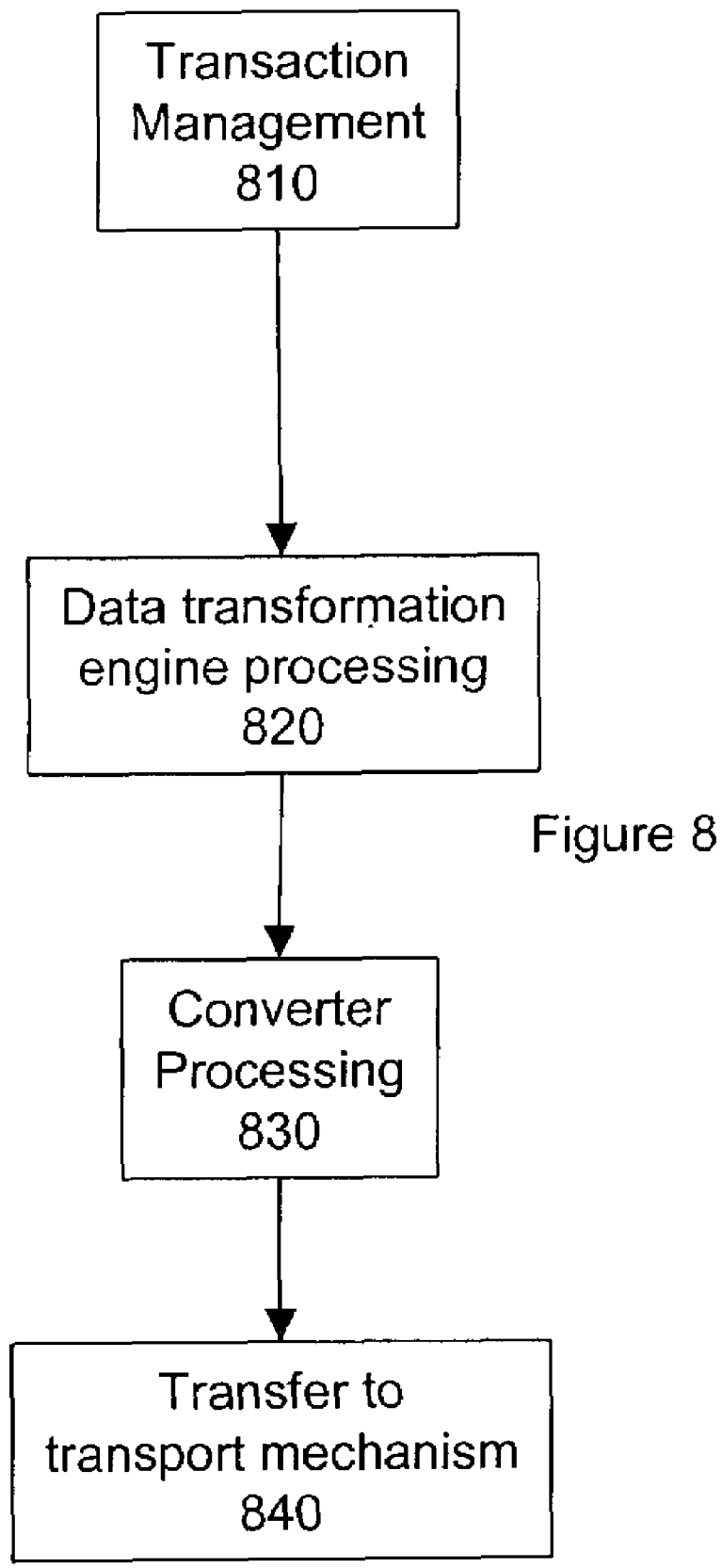
FIG. 8 illustrates an embodiment of message origination.

FIG. 8 illustrates an embodiment of message origination. At block 810, transaction management, as may be illustrated in FIG. 1 for example occurs, resulting in a set of components. At block 820, processing for data transformation engine purposes occurs as may be illustrated in FIG. 2 for example, resulting in a well-formed message. At block 830, converter processing occurs, in which the well-formed message is transformed into a message suitable for transmission such as may be illustrated in FIG. 3 for example. At block 840, the message is provided to an external system (or systems) through a transport mechanism or module. A transport mechanism in this context may be implemented as some form of HTTP transport protocol mechanism or module, as a message queue such as an MQ available from IBM for example, or through other known methods and apparatuses.

Figure 9:
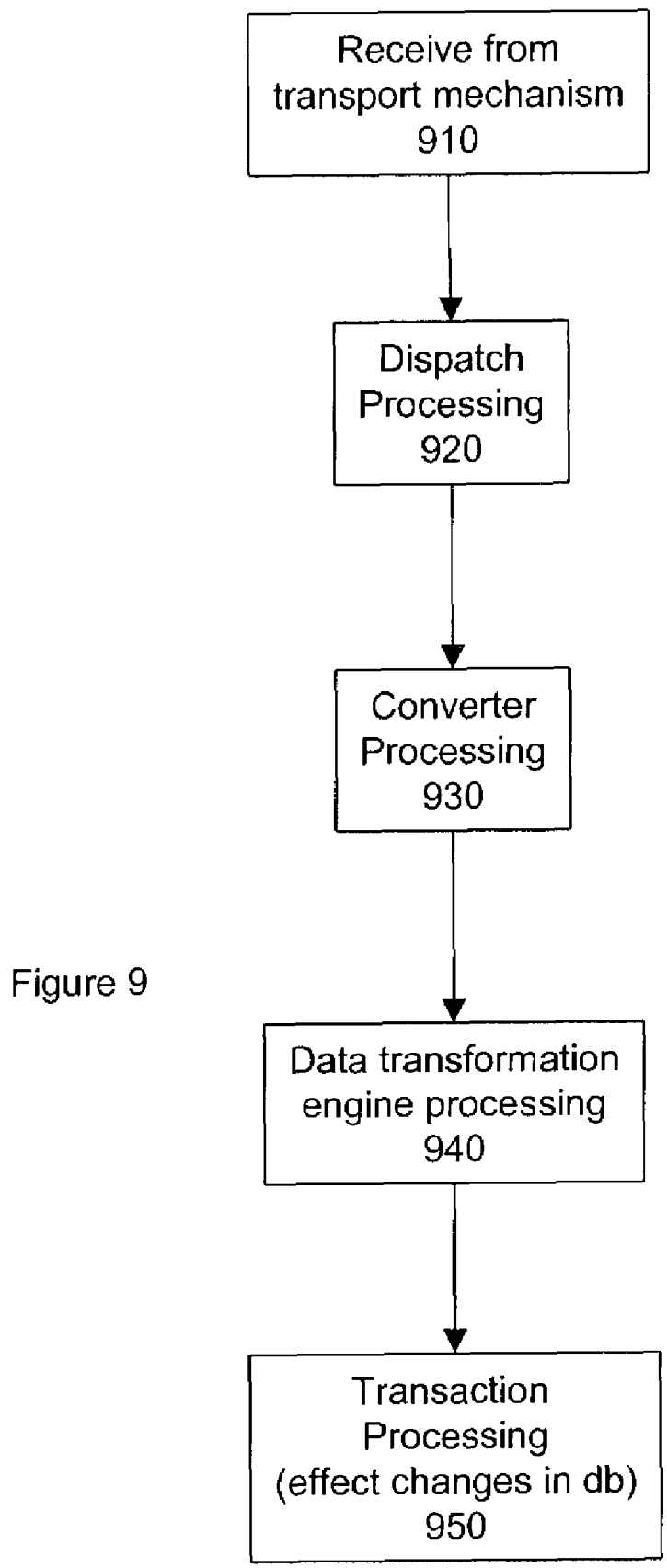
FIG. 9 illustrates an embodiment of processing received message(s).

FIG. 9 illustrates an embodiment of processing received message(s). At block 910, the message is received from a transport mechanism or module. At block 920, dispatch processing such as that described with respect to FIG. 7 occurs. At block 930, converter processing of the message, determining how to process the message occurs, such as that which may be illustrated in FIG. 4 for example. At block 940, transaction processing of the transactions in the message such as that which may be illustrated in FIG. 5 occurs. At block 950, changes in the receiving database are effected through processing such as that which may be illustrated in FIG. 6 occurs.

Figure 10:
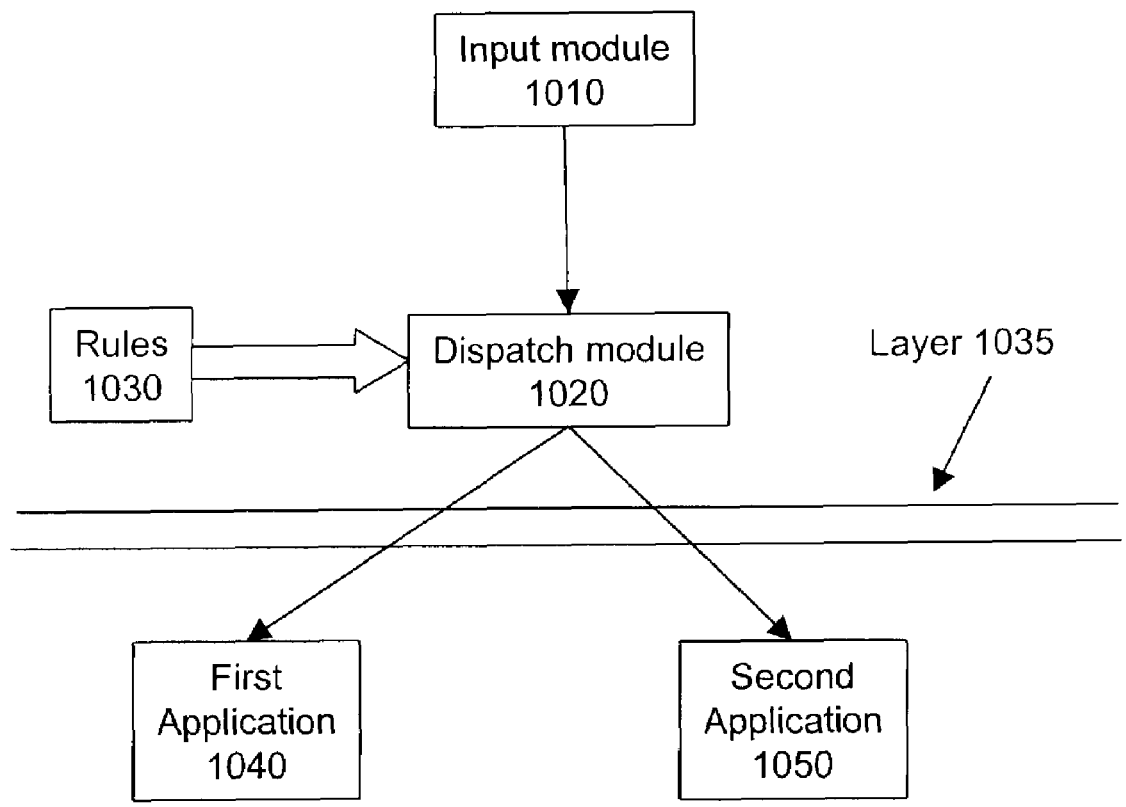
FIG. 10 illustrates an embodiment of a dispatch system or medium.

FIG. 10 illustrates an embodiment of a dispatch system or medium. Block 1010 represents an input interface with an external system, such as an interface to a message queue, an HTTP socket, or other suitable input interface. Block 1020 is a dispatch module which receives messages from block 1010 and decodes the messages. Block 1020 may be expected to retrieve a source and destination from an incoming message. Based on this decoding, using rules in block 1030, the dispatch module 1020 then provides the message to a first application 1040 or a second application 1050. Thus, block 1020 may be expected to match the retrieved source and/or destination against rules of block 1030 to determine an appropriate destination within the system in question, such as first application 1040 or second application 1050 for example. Moreover, only one of the source and destination encoded in the message may be necessary to determine an appropriate destination within the system.

As will be appreciated, this exemplary description may be generalized to a variety of different applications for example. For example, a layer 1035 may exist between dispatch module 1020 and the applications (1040, 1050). The layer 1035 may automatically route messages to a destination based on flags or other signals set by dispatch module 1020 after processing of the message(s) in question. Implementation of the layer 1035 may occur through a variety of different well-known techniques. Furthermore, in one embodiment, the rules of block 1030 may be implemented as a fixed set of rules, compiled prior to use by block 1020. It will be appreciated that various methods of handling these rules may be appropriate.

Figure 11:
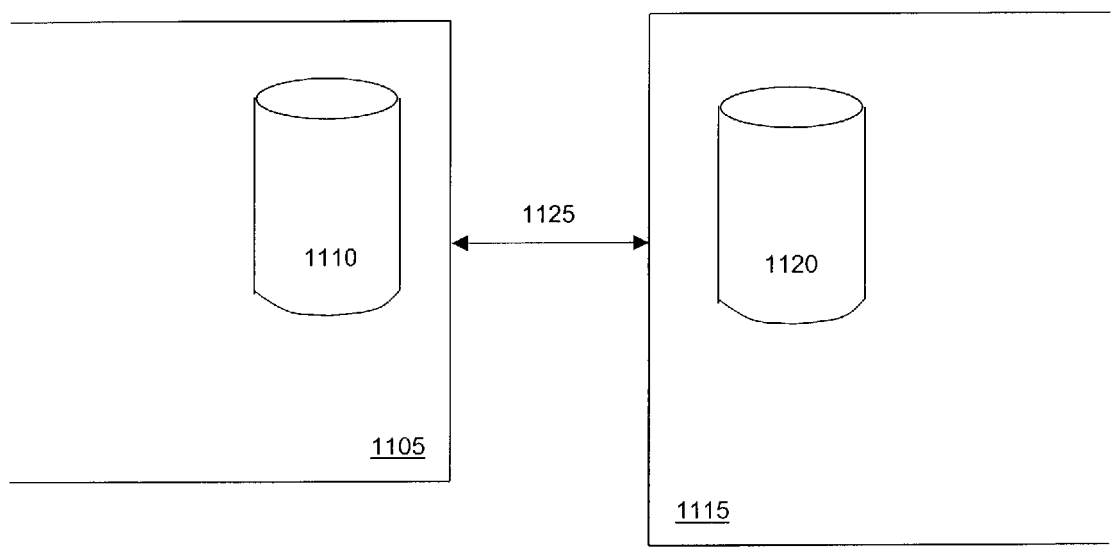
FIG. 11 illustrates an embodiment of two systems linked together.

FIG. 11 illustrates an embodiment of two systems linked together. A first system 1105 includes a first database 1110. A link 1125 links the first system 1105 to a second system 1115 including a second database 1120. The link 1125 may be implemented at one level as an MQ message queue for example, and messages may be exchanged between the first database 1110 and the second database 1120 for purposes of communicating information or synchronizing information within the databases (1110 and 1120).

In one embodiment, a dispatch system determines a destination within either the first system 1105 or the second system 1115 for messages received over the link 1125. Furthermore, in one embodiment, a converter-transformation-transaction chain (such as that illustrated in FIGS. 4, 5, and 6 respectively for example) may be used to transform a received message into changes within the database (either 1110 or 1120) of the receiving system. Similarly, in one embodiment, a transaction-transformation-converter chain (such as that illustrated in FIGS. 1, 2, and 3 respectively for example) may be used to transform a set of changes within the database (either 1110 or 1120) into a message for the transmitting or transferring system.

Figure 12:
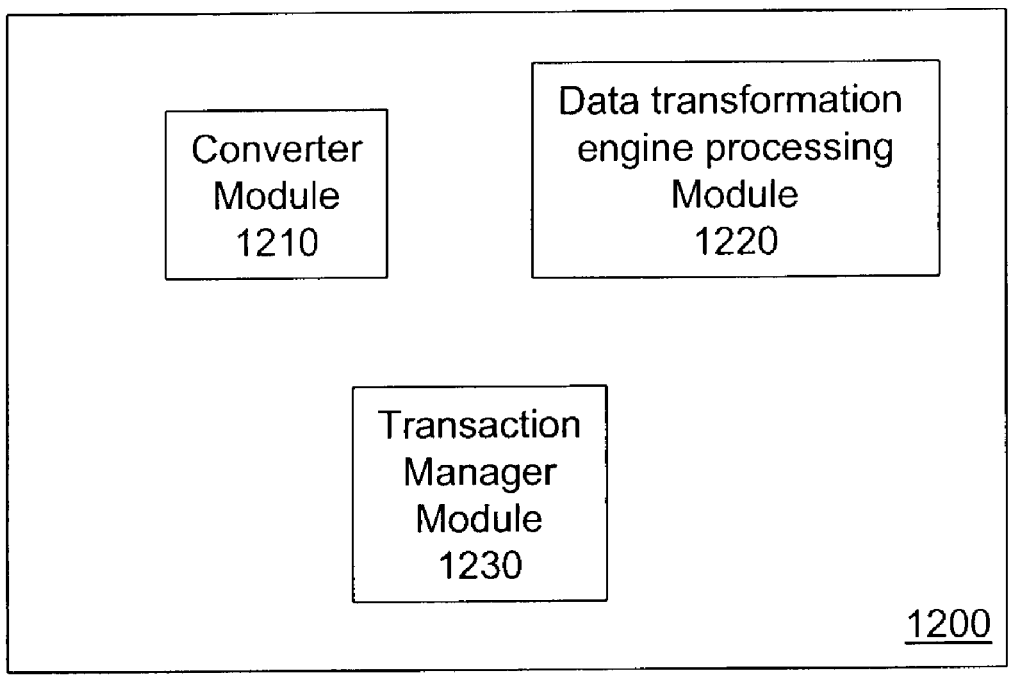
FIG. 12 illustrates an embodiment of a medium.

FIG. 12 illustrates an embodiment of a medium. The medium 1200 includes a converter module 1210 (such as one corresponding to the converters of FIG. 3 or 4 for example). The medium 1200 also includes a data transformation engine module 1220 (such as one corresponding to the data transformation engine modules of FIG. 2 or 5 for example). The medium 1200 also includes a transaction manager 1230 (such as one corresponding to the transaction managers of FIG. 1 or 6 for example). As described below, this may be a machine readable medium embodying instructions for execution on a processor, which, when executed by the processor, cause the processor and an associated system or machine to perform a method.

Figure 13:
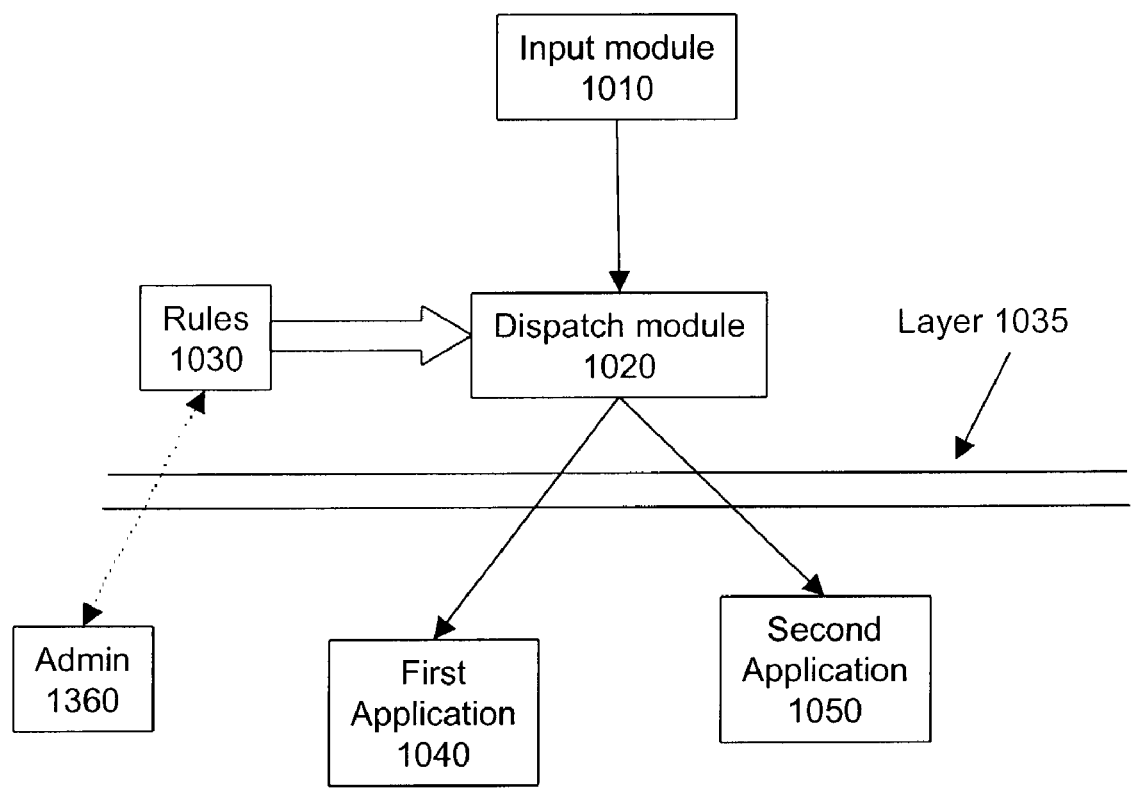
FIG. 13 illustrates an alternate embodiment of a dispatch system or medium.

FIG. 13 illustrates an alternate embodiment of a dispatch system or medium. As illustrated, the embodiment of FIG. 13 adds the administrative interface of block 1360 to the embodiment of FIG. 10. The administrative interface of block 1360 may be used to initially set or modify the rules of block 1030 which govern the dispatch module of block 1020. Furthermore, it will be appreciated that modification of the rules of block 1030 may be achieved in a dynamic or real-time manner, allowing for changes in behavior of the system according to needs or preferences which similarly change.

Figure 14:
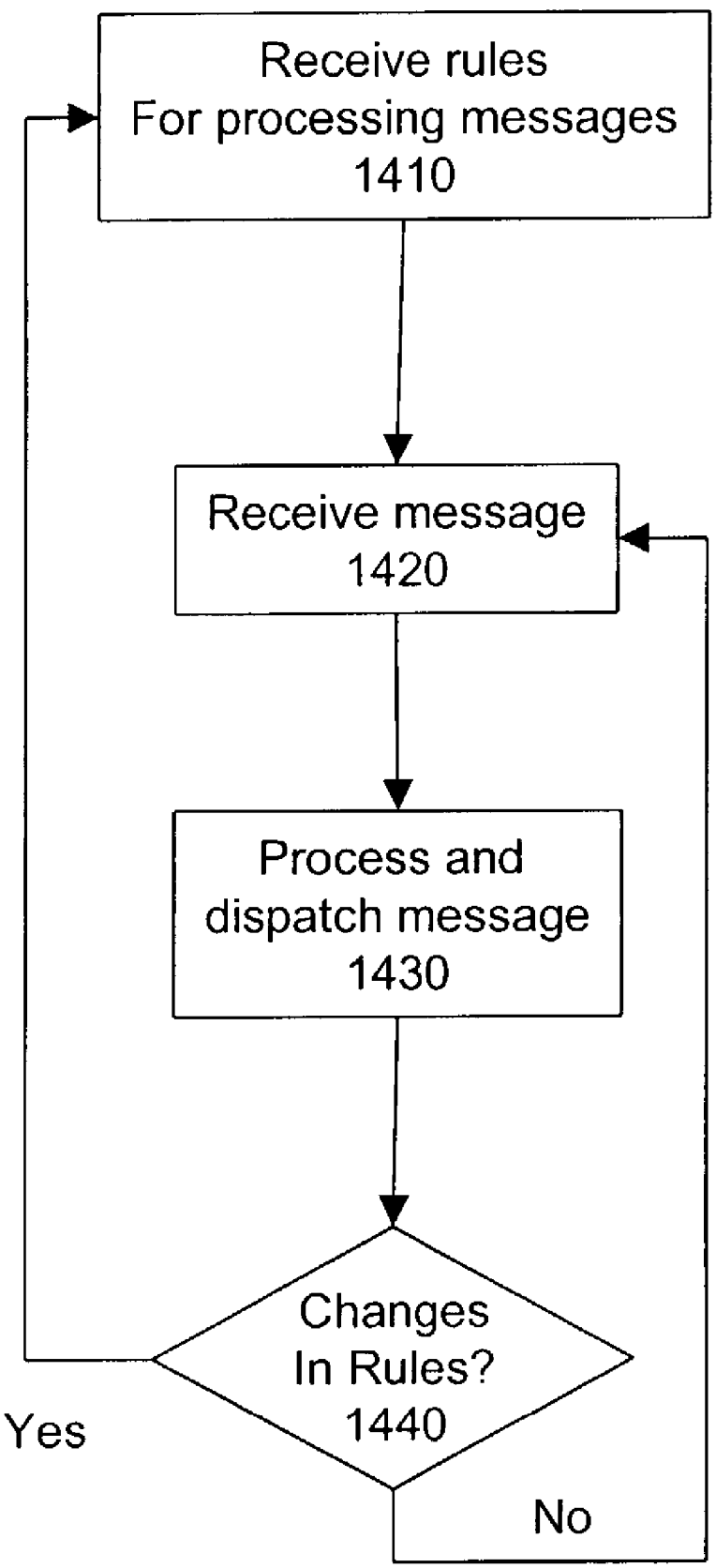
FIG. 14 illustrates another alternate embodiment of a dispatch system or medium.

FIG. 14 illustrates another alternate embodiment of a dispatch system or medium. At block 1410, rules for processing messages are received. At block 1420, a message is received, such as from a message queue or HTTP interface for example. At block 1430, the message is processed and dispatched to an appropriate destination within the system. At block 1440, a determination is made as to whether the rules received in block 1410 have been updated or otherwise changed. If so, the process returns to block 1410, and new rules are received. If not, the process returns to block 1420, and the next message is processed based on the current set of rules.

Figure 15:
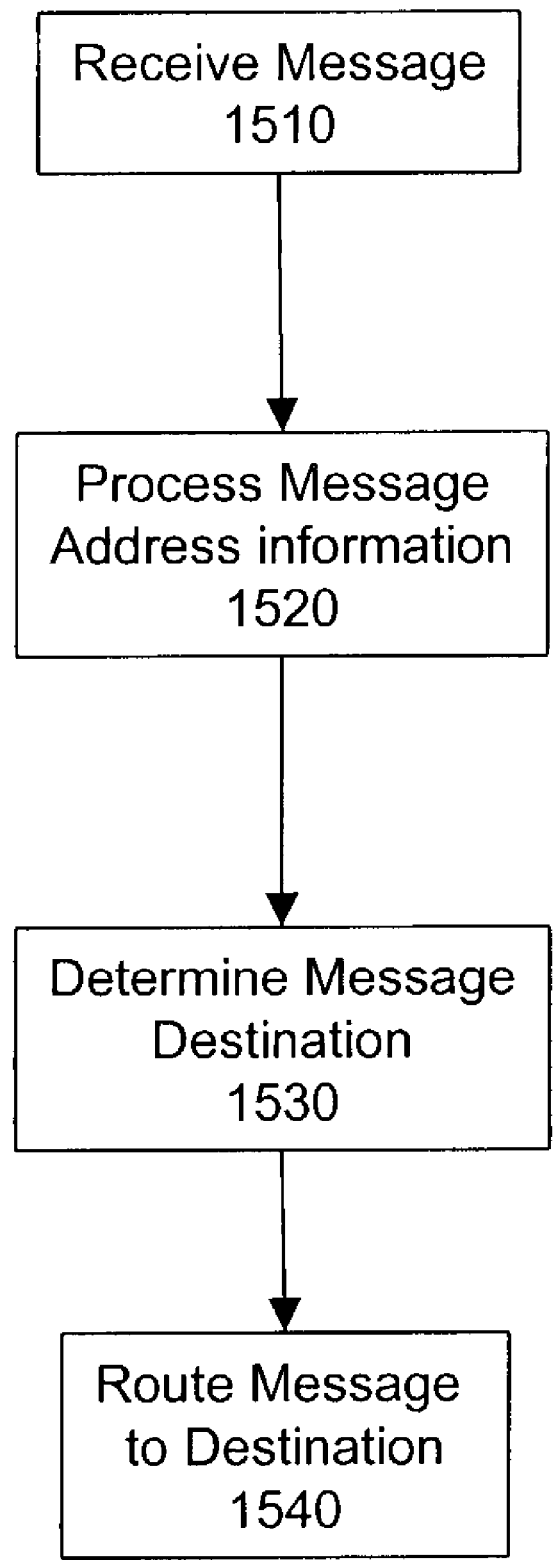
FIG. 15 illustrates yet another alternate embodiment of a dispatch system or medium.

FIG. 15 illustrates yet another alternate embodiment of a dispatch system or medium. At block 1510, a message is received. At block 1520, the message address information, such as a source and or destination for the message for example, are processed. This processing may involve retrieving the information in question from the message (such as from predefined fields for example) or otherwise determining a source and/or destination. At block 1530, the message destination within the system (which may or may not be identical to the destination retrieved from the message) is determined, based on the results of block 1520 and any processing rules which may be available for interpreting those results. Note that such processing rules may include a default destination within the system for messages which do not otherwise have an identifiable destination within the system. At block 1540, the message is actually routed to the destination in question. This may or may not include any source and/or destination information, as that information may be stripped from the message during processing.

The next section illustrates a variation on the embodiments presented with respect to FIGS. 1, 2, 3, 4, 5, 6 and 7, which may be used with embodiments illustrated with respect to FIGS. 8, 9, 10, 11, 12, 13, 14 and 15, among other embodiments. Each of the embodiments illustrated in FIGS. 16, 17, 18, 19, 20, 21, and 22 vary from the embodiments of FIGS. 1-7 through the use of script customization which is exclusive of or additive to any default aspects of the embodiment.

Generally, several aspects apply to customization. First, a basic or vanilla connector (set of transformation, converting and processing routines) is configured, much as any software may be initially configured. Next, the behavior of the connector is configured through user-definable properties, as discussed previously with respect to FIGS. 1-7. Then, custom scripts are provided to further configure (alter) the connector to process data in a manner generally different from default or preset processing methods. Finally, the connector is operated using the custom scripts. This may further involve additional specification of information, such as locations or other address information for the custom scripts, configuration of control information for the connector suitable to include the scripts, configuration of data transformation maps, configuration of workflow information for the connector, or compilation of information about custom scripts into the connector. Thus, while customization with respect to FIGS. 1-7 involved configuration of software or databases for example, customization with respect to FIGS. 16-22 involves custom scripts which may override default of configured processing.

Figure 16:
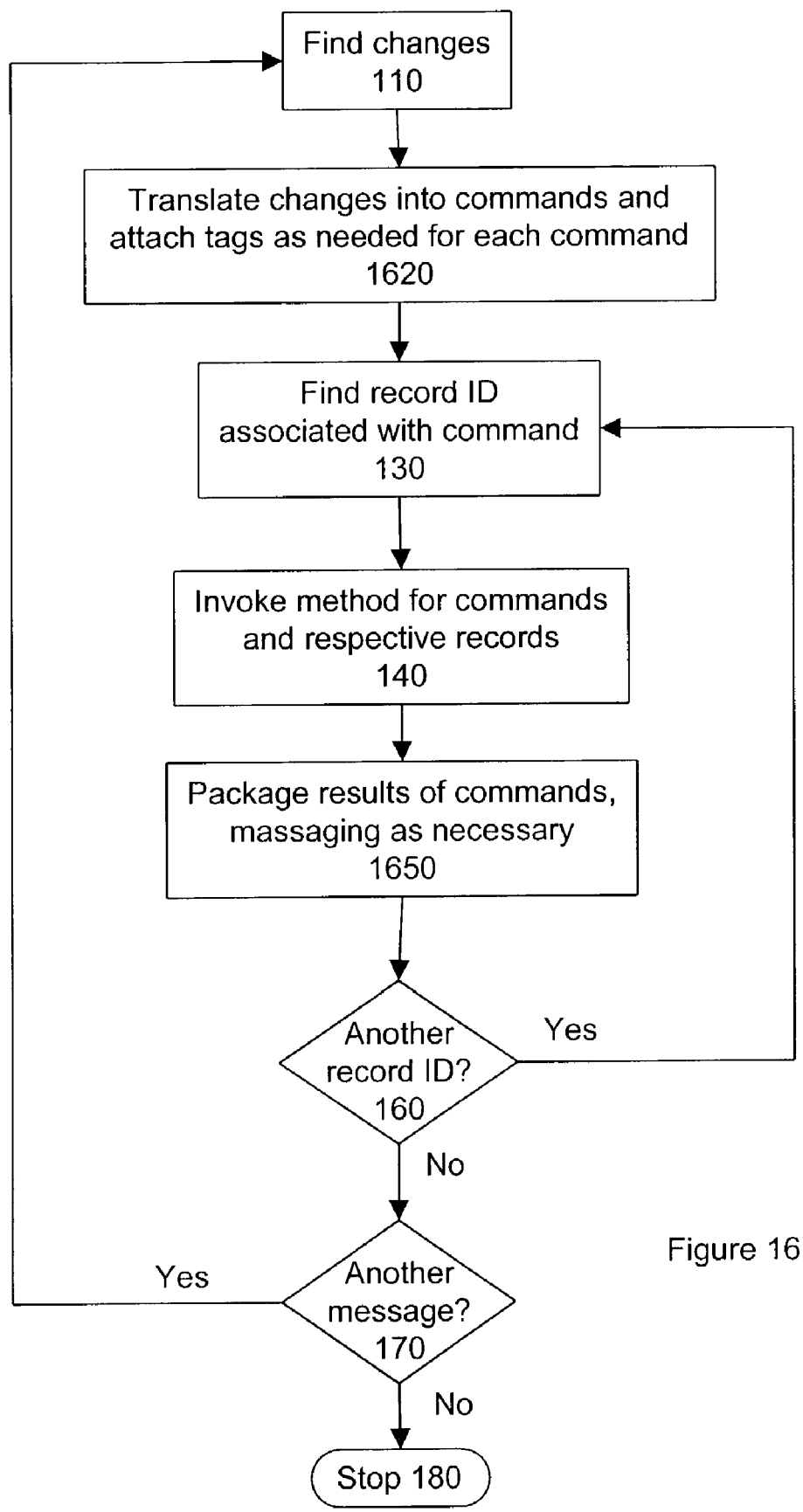
FIG. 16 illustrates another alternate embodiment of transaction processing.

FIG. 16 illustrates another alternate embodiment of transaction processing. As will be appreciated, most of the blocks in this illustration have already been described with respect to FIG. 1. However, blocks 1620 and 1650 illustrate variations peculiar to some embodiments. At block 1620, changes are translated into commands and tags are attached as necessary. This may be achieved in a default manner, such as that corresponding to block 120. However, it may also be customized through use of a script developed by someone using or controlling the system. The script in question may be provided with a name or location such that it may be located during processing of the commands, and the script may be expected to include suitable routines for translating changes into commands and attaching tags. Thus, the script may be used to customize the transaction processing to take into account proprietary formats, unusual data, and other issues not addressed by standard transaction processing. Similarly, at block 1650, results of commands are packaged and massaged as necessary. Such a block may be effectively replaced by a custom script, thereby allowing for different behavior in the processing block. For both of these blocks (1620, 1650), either a default process may occur, or a custom script may be used, with each being exclusive of the other. Note also that no provision is made for additional customized or user-defined processing.

Figure 17:
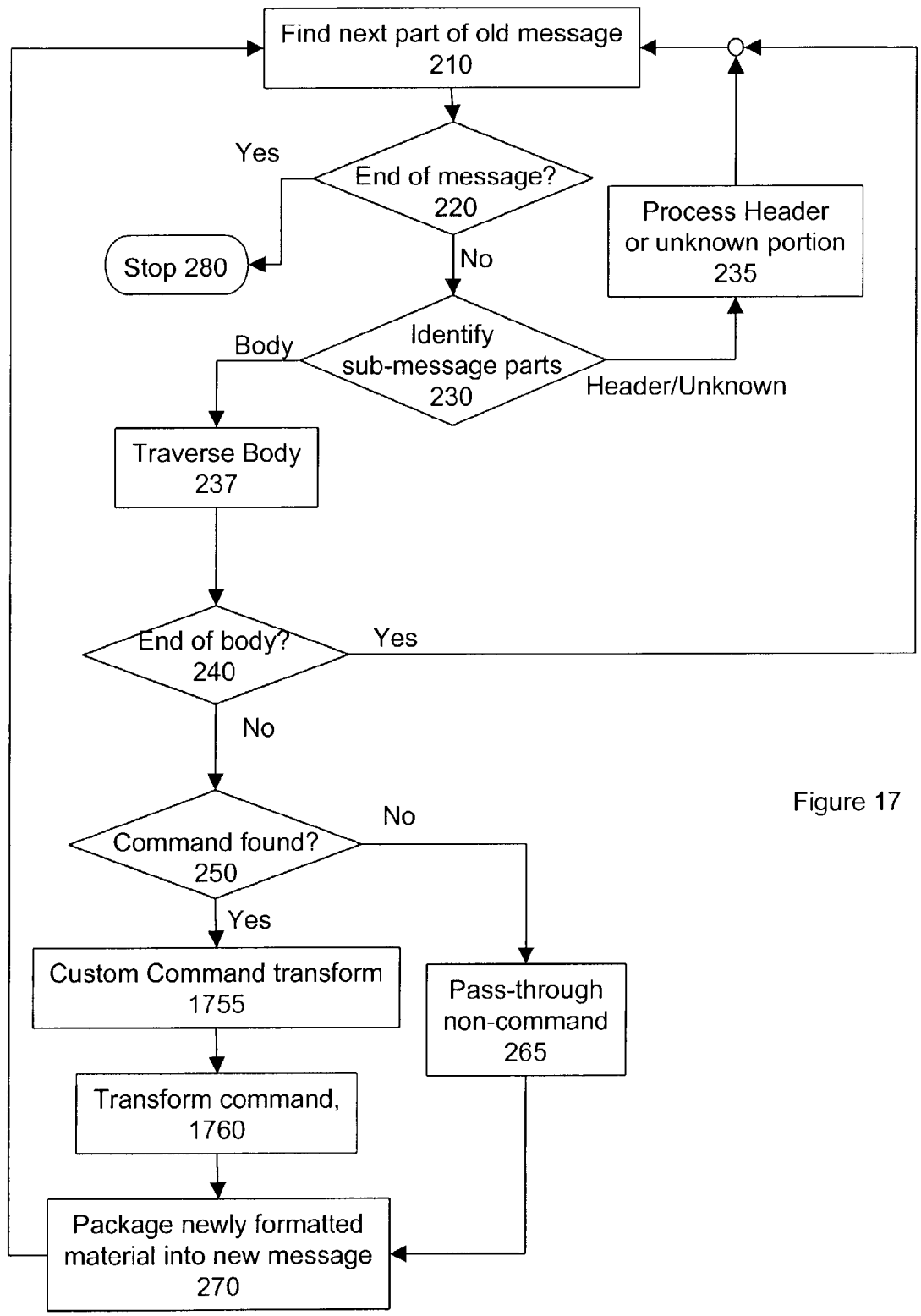
FIG. 17 illustrates another alternate embodiment of data transformation engine processing.

FIG. 17 illustrates another alternate embodiment of data transformation engine processing. As will be appreciated, most of the blocks in this illustration have already been described with respect to FIG. 2. However, blocks 1755 and 1760 illustrate variations peculiar to some embodiments. At block 1755, custom command transformation occurs, such as massaging of the command as with respect to block 260 of FIG. 2, or through use of a custom script in a manner similar to that with respect to block 1620. At block 1760, the command is transformed, in a manner similar to transformation with respect to block 260 of FIG. 2, but without any massaging. In some embodiments, this occurs as it would with block 260, namely the process is predefined. In some alternate embodiments, a custom script is used in its place, in a manner similar to that in block 1620. Thus, the custom scripts may be expected to handle command transformation and custom command transformation, but in a manner defined by a user or controller of the system, rather than the manner provided for through default processing. Furthermore, the custom scripts may be expected to be exclusionary to the default processing, and may be the only customization allowed.

Figure 18:
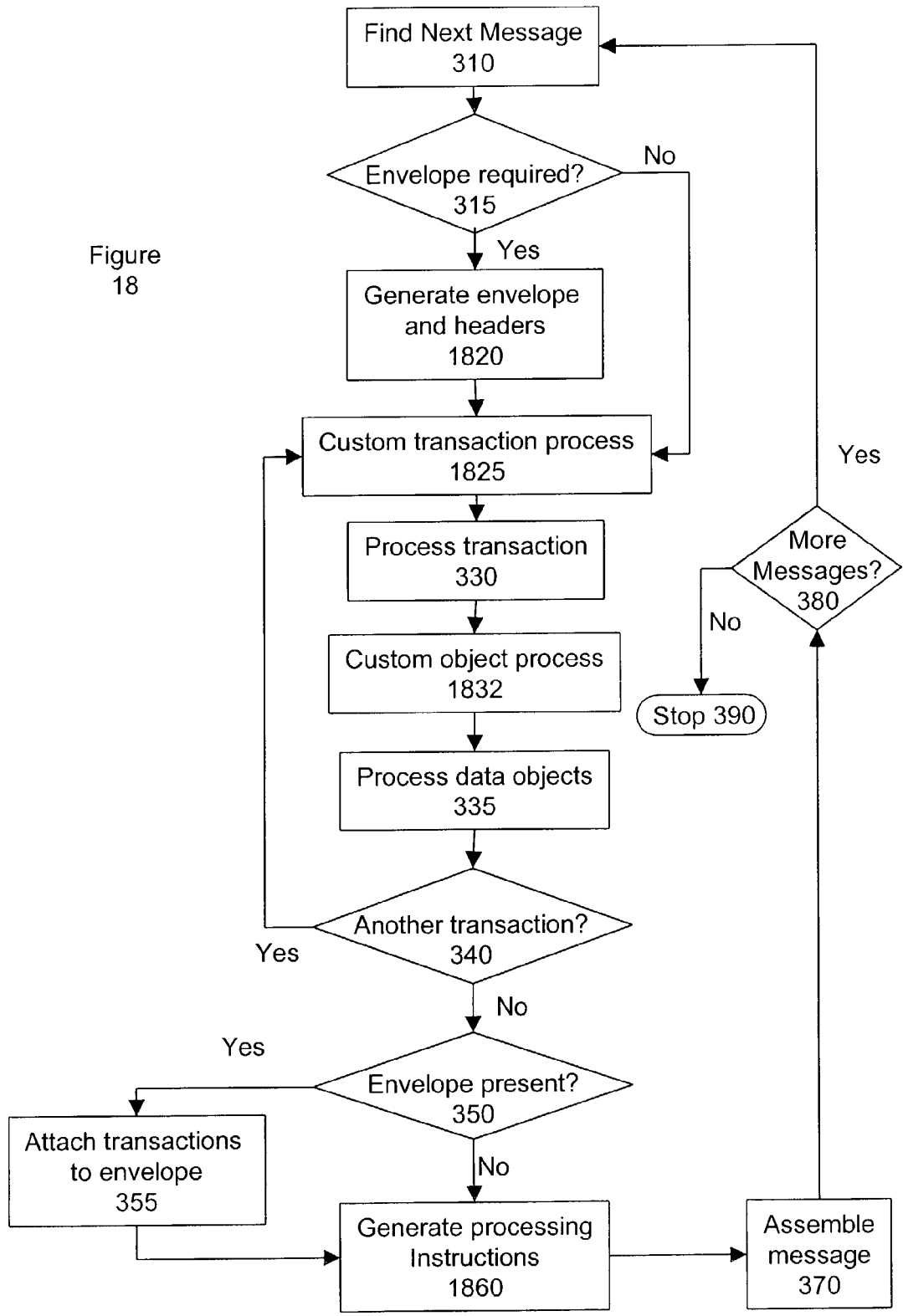
FIG. 18 illustrates another alternate embodiment of converter processing.

FIG. 18 illustrates another alternate embodiment of converter processing. As will be appreciated, most of the blocks in this illustration have already been described with respect to FIG. 3. However, blocks 1820, 1825, 1832 and 1860 illustrate variations peculiar to some embodiments. At block 1820, either the envelope and headers are generated in a default manner, or by a replacement custom script. At block 1825, either the transaction is processed in a default manner based on the configuration of the software, or by a replacement custom script. Similarly, at blocks 1832 and 1860, data objects are processed and processing instructions are generated in either a default manner (which may be influenced by configuration for block 1832) or through use of a custom script. In this way, customization is allowed, but also limited to a predictable and controlled portion of the process.

Figure 19:
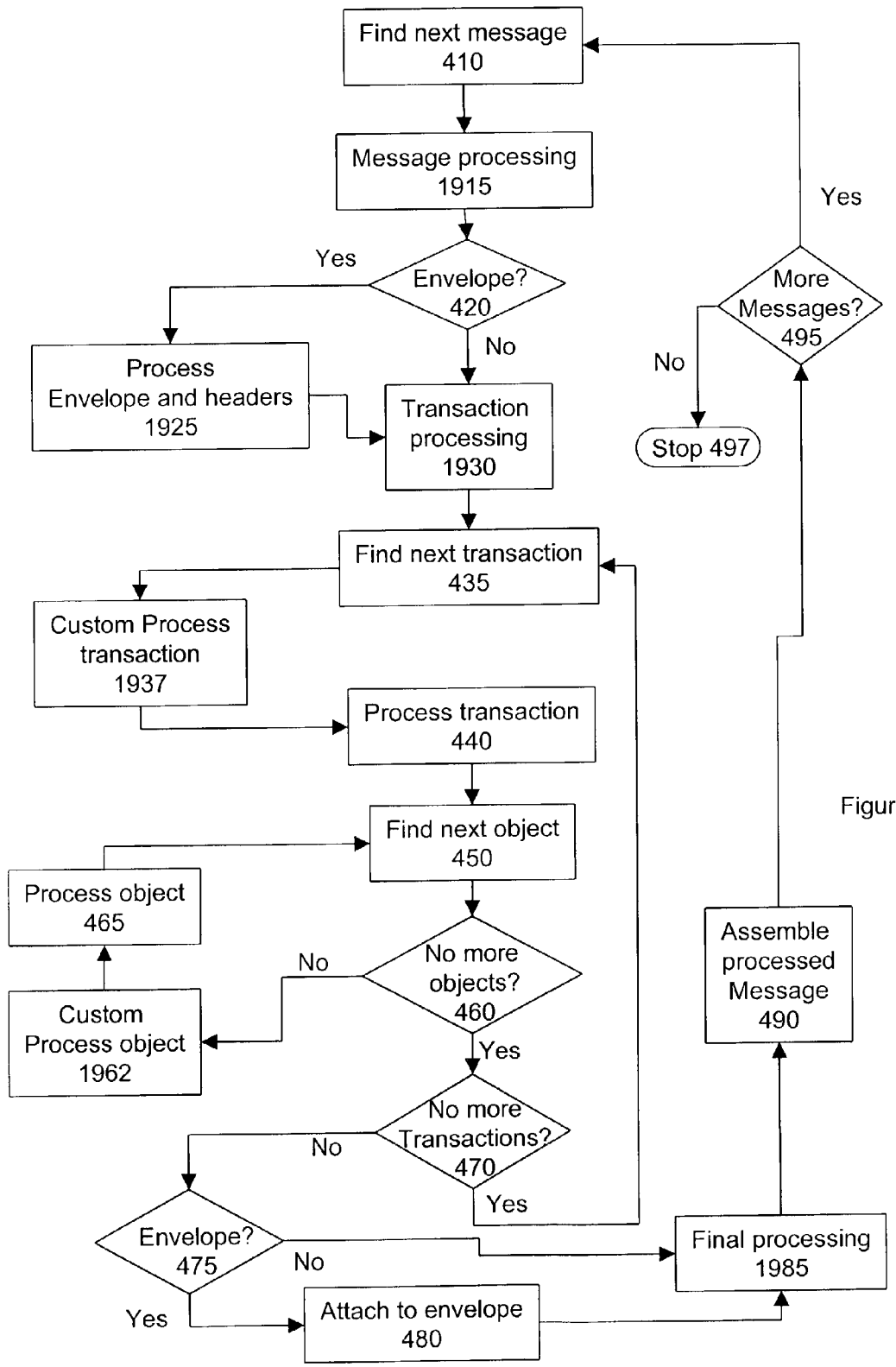
FIG. 19 illustrates yet another alternate embodiment of converter processing.

FIG. 19 illustrates yet another alternate embodiment of converter processing. As will be appreciated, most of the blocks in this illustration have already been described with respect to FIG. 4. However, blocks 1915, 1925, 1930, 1937, 1962 and 1985 illustrate variations peculiar to some embodiments. At block 1915, message processing occurs, either by default manner or by custom script. At block 1925, envelopes and headers are found and processed, either by a default process or through use of a custom script. Similarly, at blocks 1930 and 1937, transaction processing occurs either by default (with possible configuration overrides) or by custom script. This may use the same or two different custom scripts for example. At block 1962, the object in question is either processed in a default manner (with configuration overrides if appropriate) or through use of a custom script. Finally, at block 1985, the final processing is carried out either in a default manner or through use of a custom script. Note that the customization at block 1985 may be in the form of a NO-OP or non-operative script to eliminate this block, and similar opportunities exist for other blocks.

Figure 20:
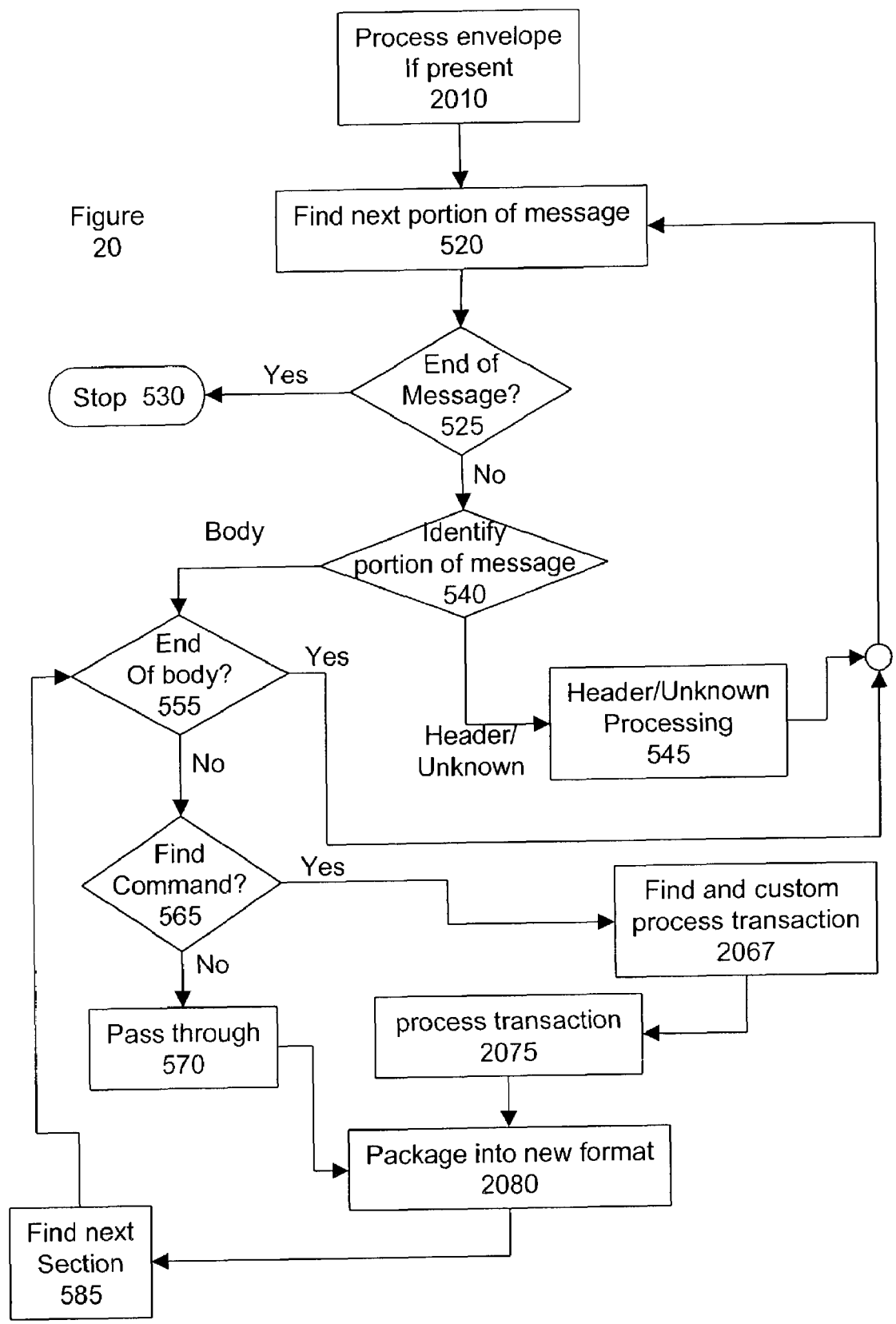
FIG. 20 illustrates yet another alternate embodiment of data transformation engine processing.
Figure 21:
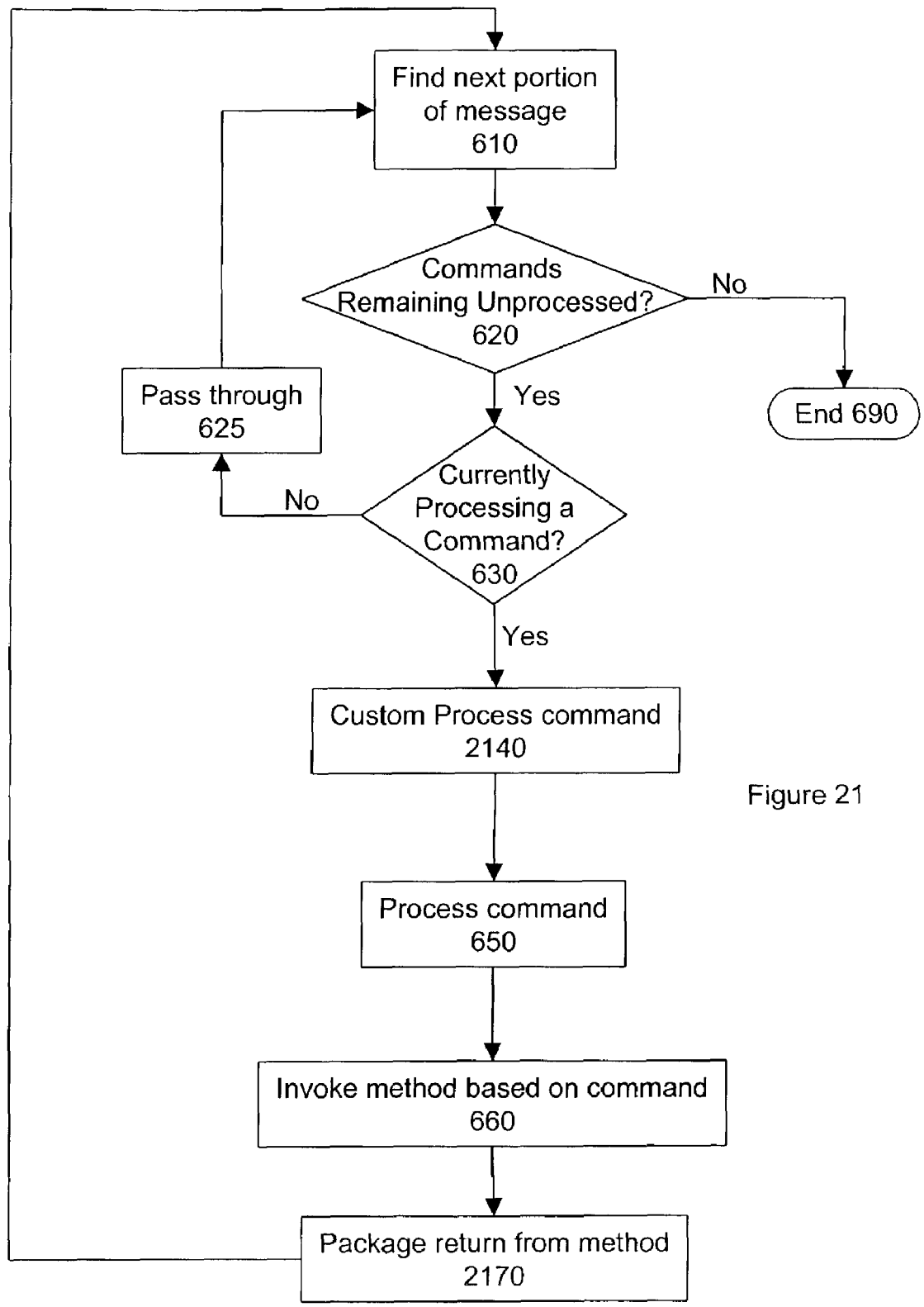
FIG. 21 illustrates yet another alternate embodiment of transaction processing.
Figure 22:
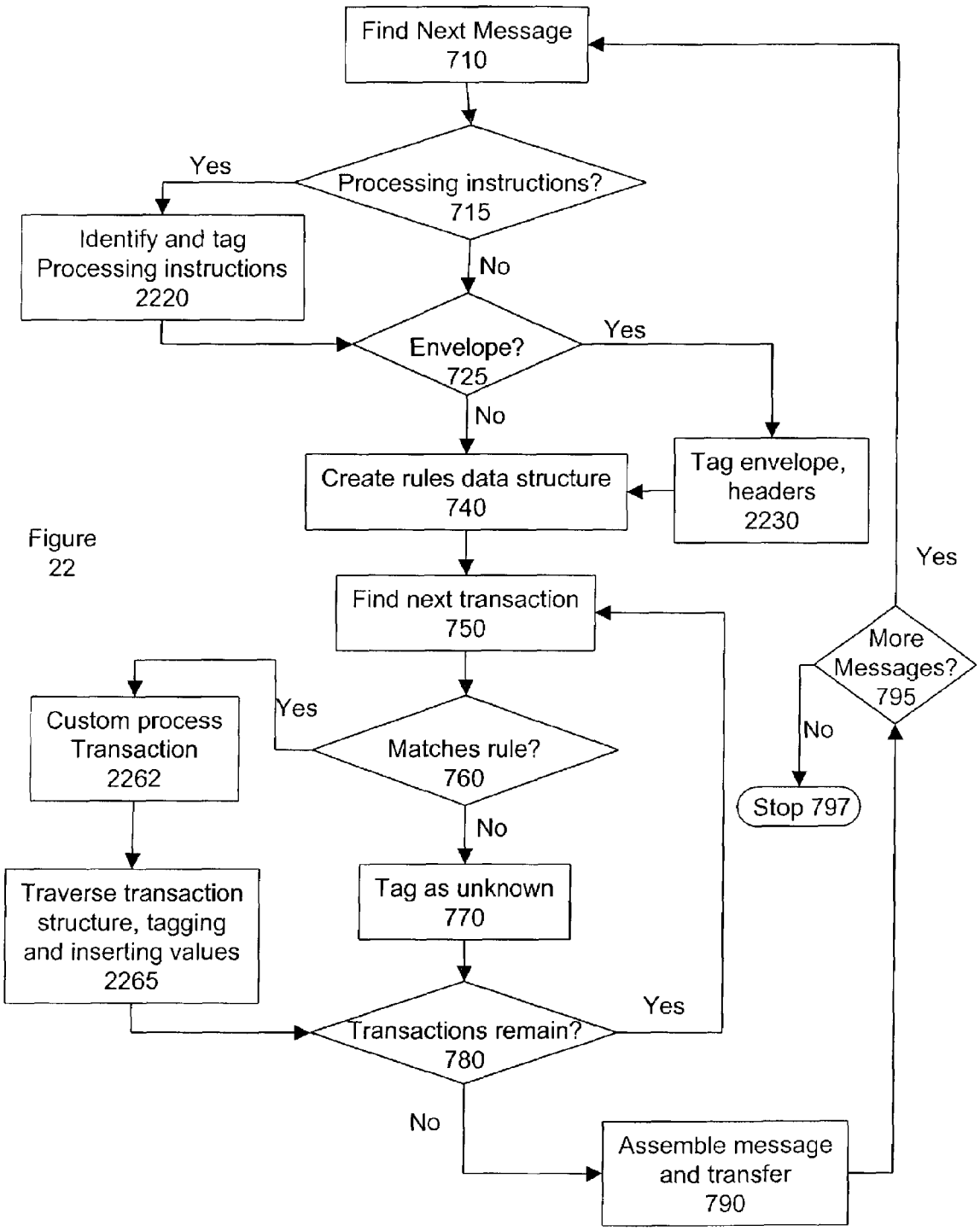
FIG. 22 illustrates another embodiment of message dispatch.

FIG. 20 illustrates yet another alternate embodiment of data transformation engine processing. As will be appreciated, most of the blocks in this illustration have already been described with respect to FIG. 5. However, blocks 2010, 2067, 2075 and 2080 illustrate variations peculiar to some embodiments. At each of blocks 2010, 2067, 2075, and 2080, the expected processing may be handled by either a default process or through use of a custom script. Similarly, FIG. 21 illustrates yet another alternate embodiment of transaction processing. As will be appreciated, most of the blocks in this illustration have already been described with respect to FIG. 6. However, blocks 2140 and 2170 illustrate variations peculiar to some embodiments. As will be appreciated, each of blocks 2140 and 2170 may utilize either a default process or a custom script. Also, FIG. 22 illustrates another alternate embodiment of message dispatch. As will be appreciated, most of the blocks in this illustration have already been described with respect to FIG. 7. However, blocks 2220, 2230, 2262 and 2265 illustrate variations peculiar to some embodiments. Each of these blocks may similarly involve either of a default process or a custom script.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program stored in the computer. Such a computer program may be stored in a machine readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIG. 7, 8, 9 or 12 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc. . . . ) as taken in action or causing a result. Such expressions are merely a shorthand way of saying that execution of the software by a computer causes the processor of the computer to perform an action or produce a result.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 12 may be integrated into components, or may be subdivided into components. Similarly, the blocks of FIG. 8 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of sending change information from a first database to a second database, comprising:
   within the first database, identifying data that has changed since some prior point in time, wherein the identified data changed as a result of executing a set of executable commands associated with the identified data;
   regenerating the set of executable commands associated with the identified data;
   attaching a tag to a first command of the regenerated set of executable commands, wherein the tag comprises a conversion rule for the first command, wherein the conversion rule when employed, is configured to resolve at least one discrepancy resulting from a database schema for the first database being different from a database schema for the second database;
generating a first message as a function of the regenerated set of executable commands wherein the message comprises the regenerated set of executable commands;
   transforming the first message into a second message; and
   converting the second message into a transmittable message.

2. The method of claim 1 further comprising:
   finding a record identifier related to the first command, invoking a method for the first command and the record associated with the record identifier.

3. The method of claim 2 wherein:
   transforming the first message into the second message comprises finding a next part of the first message, identifying sub-message parts of the next part, traversing a body of the first message, finding the first command of the body of the first message, transforming the first command of the body of the first message into a special format based on a set of pre-defined rules for repackaging, and packaging the formatted first message into the second message.

4. The method of claim 3 wherein:
   converting the second message into the transmittable message comprises finding the second message, determining whether an envelope is required for the transmittable message, processing a transaction of the second message processing data objects of the transaction of the second message, generating processing instructions for the second message, and assembling the processed transaction, processed data objects, and processing instructions into the transmittable message.

5. The method of claim 4 wherein:
   converting the second message into the transmittable message further comprises generating an envelope and headers if required for the transmittable message, and attaching the processed transaction and the processed data objects to the envelope of the transmittable message if the envelope is present.

6. The method of claim 5 wherein:
   transforming the first message into the second message further comprises processing a header portion of the first message and passing through non-commands of the body portion of the first message.

7. The method of claim 1 wherein the conversion rule resolves the discrepancy resulting from the data type of a customer_id in the first database being defined as of type string and the data type of the customer_id being of type integer in the second database.

8. The method of claim 7 wherein the conversion rule causes the system to perform a set of predefined operations to convert the parameter customer_id from data type string into data type integer to resolve the discrepancy resulting from the distinct data types in the first and the second database.

9. A machine-readable medium embodying instructions, which, when executed by a processor, cause the processor to perform a method of sending change information from a first database to a second database, the method comprising:
   within the first database, identifying data that has changed since some prior point in time wherein the identified data changed as a result of executing a set of executable commands associated with the identified data;
   generating regenerating the set of executable commands associated with the identified data;
   attaching a tag to a first command of the regenerated set of executable commands, wherein the tag comprises a conversion rule for the first command the conversion rule when employed is configured to resolve at least one discrepancy resulting from distinct database management systems for the first database and the second database;
   generating a first message as a function of the regenerated set of executable commands wherein the message comprises the regenerated set of executable commands;
   transforming the first message into a second message utilizing a custom script and default processing; and
   converting the second message into a transmittable message;
   transmitting the transmittable message to a computer system in data communication with the second database.

* * * * *

UNITED STATES PATENT AND TRADEMARK OFFICE
CERTIFICATE OF CORRECTION

PATENT NO. : 7,506,068 B2  Page 1 of 1
APPLICATION NO. : 10/211442
DATED : March 17, 2009
INVENTOR(S) : Liou et al.

It is certified that error appears in the above-identified patent and that said Letters Patent is hereby corrected as shown below:

In column 14, line 13, in claim 4, after "message" insert -- , --.

Signed and Sealed this

Eighteenth Day of May, 2010

David J. Kappos
*Director of the United States Patent and Trademark Office*